United States Patent
Shimahashi et al.

(10) Patent No.: US 9,628,666 B2
(45) Date of Patent: Apr. 18, 2017

(54) IMAGE PROCESSING DEVICE GENERATING COMBINED IMAGED DATA BY USING FIRST IMAGE DATA AND SECOND IMAGE DATA

(71) Applicant: BROTHER KOGYO KABUSHIKI KAISHA, Nagoya, Aichi (JP)

(72) Inventors: Takuya Shimahashi, Nagoya (JP); Tomohiko Hasegawa, Okazaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/868,595

(22) Filed: Sep. 29, 2015

(65) Prior Publication Data

US 2016/0094755 A1 Mar. 31, 2016

(30) Foreign Application Priority Data

Sep. 30, 2014 (JP) .................................. 2014-199893

(51) Int. Cl.
*H04N 1/387* (2006.01)
*H04N 1/60* (2006.01)

(52) U.S. Cl.
CPC ......... *H04N 1/3876* (2013.01); *H04N 1/3872* (2013.01); *H04N 1/3873* (2013.01); *H04N 1/60* (2013.01); *H04N 2201/0094* (2013.01)

(58) Field of Classification Search
None
See application file for complete search history.

(56) References Cited

U.S. PATENT DOCUMENTS

| 5,481,375 A | * | 1/1996 | Eto | ..................... H04N 1/00795 358/450 |
| 6,148,118 A | | 11/2000 | Murakami et al. | |
| 6,507,415 B1 | * | 1/2003 | Toyoda | ................ H04N 1/3876 358/450 |

(Continued)

FOREIGN PATENT DOCUMENTS

| JP | H05-342345 A | 12/1993 |
| JP | H06-14157 A | 1/1994 |
| JP | H09-121277 A | 5/1997 |

(Continued)

OTHER PUBLICATIONS

Related U.S. Appl. No. 15/071,560, filed Mar. 16, 2016.

*Primary Examiner* — Christopher D Wait
(74) *Attorney, Agent, or Firm* — Scully, Scott, Murphy & Presser, PC

(57) ABSTRACT

An image processing device acquires first image data representing a first image and second image data representing a second image. The first image includes a first edge and a first region. The second image includes a second edge and a second region. The image processing device generates, when a first condition is met, first combined image data representing a first combined image by using the first image data and the second image data so that the first region is overlapped with the second region. The image processing device generates, when a second condition different from the first condition is met, second combined image data representing a second combined image by using the first image data and the second image data so that the first edge adjoins the second edge.

9 Claims, 13 Drawing Sheets

(56) References Cited

U.S. PATENT DOCUMENTS

2006/0209366 A1* 9/2006 Edwards .............. H04N 1/3876
358/498
2012/0250100 A1 10/2012 Kuraya et al.

FOREIGN PATENT DOCUMENTS

| JP | H11196261 A | 7/1999 |
|---|---|---|
| JP | 2012-212963 A | 11/2012 |

* cited by examiner

FIG. 5(A)
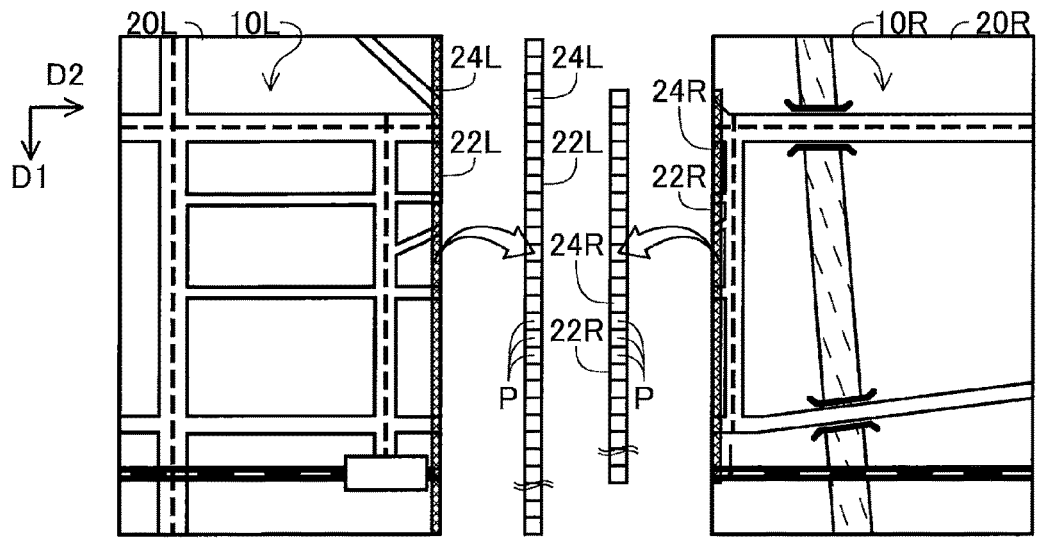
FIG. 5(B)   FIG. 5(C)   FIG. 5(D)   FIG. 5(E)
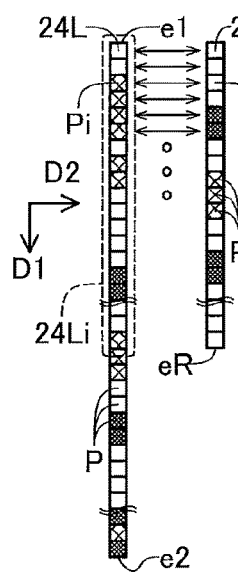 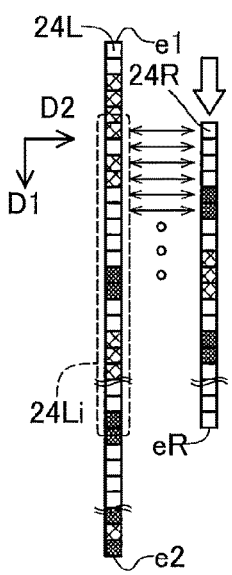 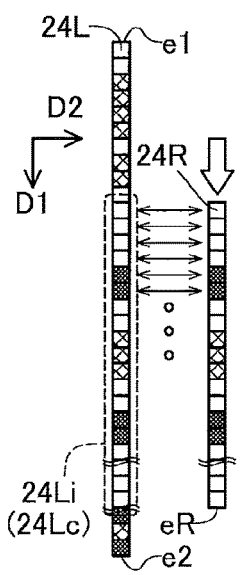 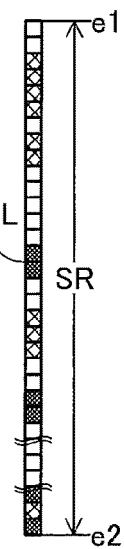

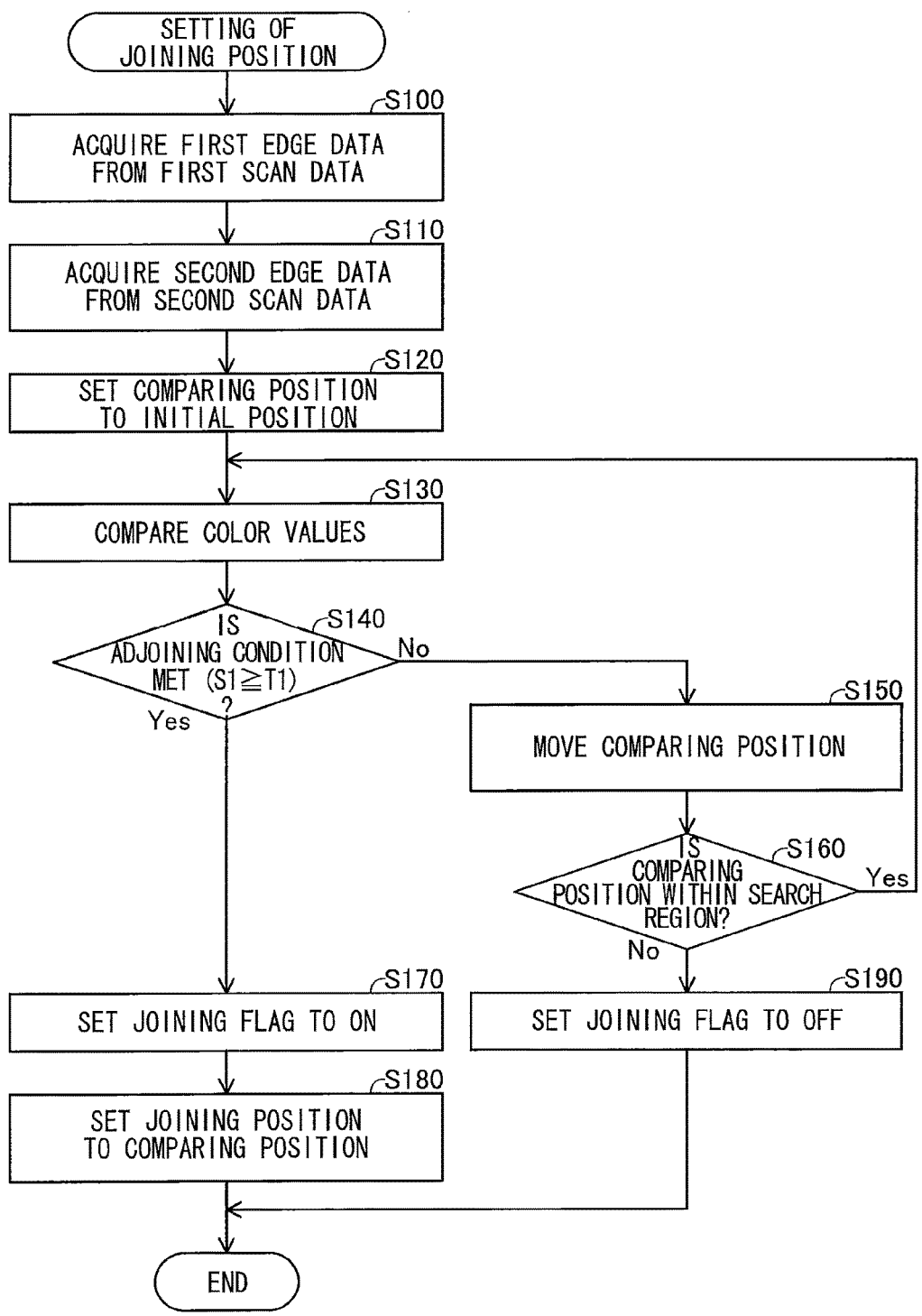

FIG. 7(A)
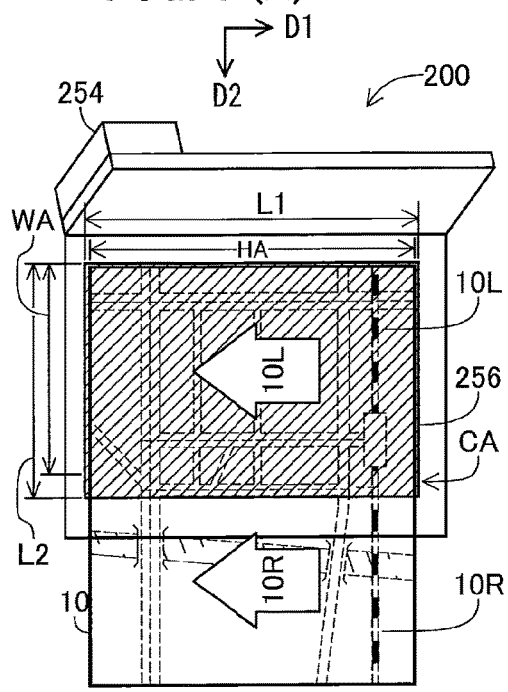
FIG. 7(B)
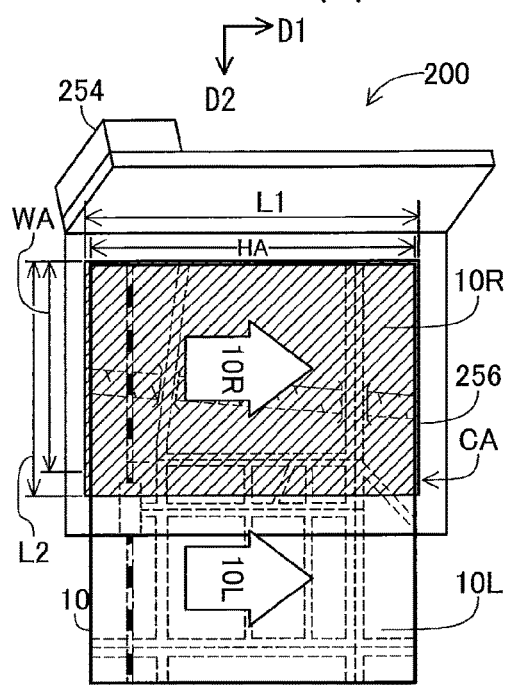
FIG. 8
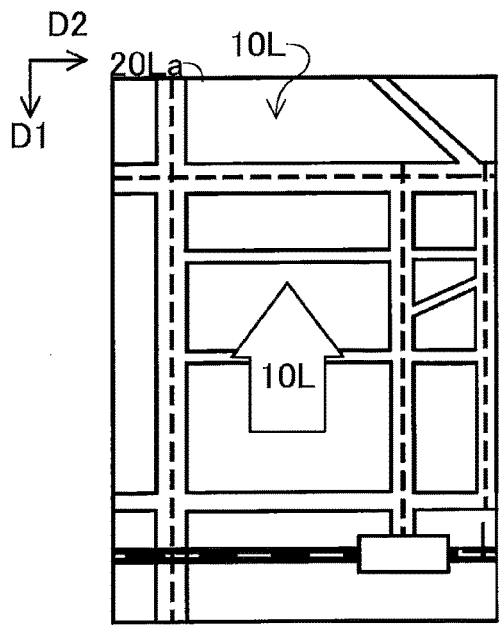
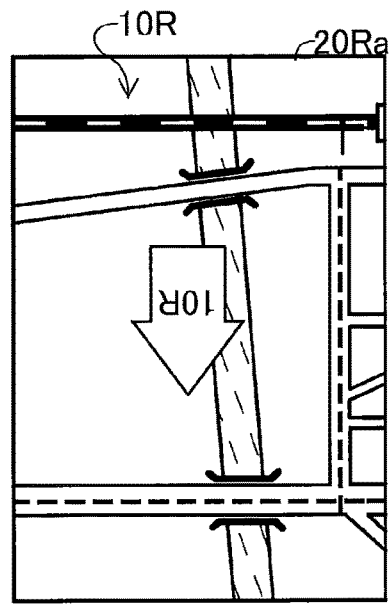

FIG. 12 (A)
S46 → [SMOOTHING COLOR VALUES] → S90
         S48
FIG. 12 (B)
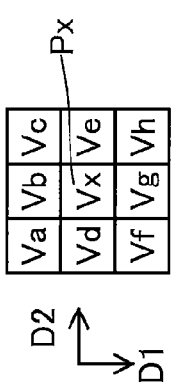
$$V_x = \frac{V_a + V_b + V_c + V_d + V_e + V_f + V_g + V_h}{8}$$
FIG. 12 (C)
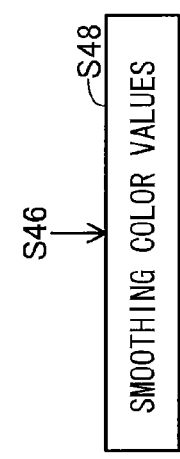

IMAGE PROCESSING DEVICE GENERATING COMBINED IMAGED DATA BY USING FIRST IMAGE DATA AND SECOND IMAGE DATA

CROSS REFERENCE TO RELATED APPLICATION

This application claims priority from Japanese Patent Application No. 2014-199893 filed Sep. 30, 2014. The entire content of the priority application is incorporated herein by reference.

TECHNICAL FIELD

The present disclosure relates to a technique for generating image data representing a single image formed by combining a first image and a second image.

BACKGROUND

A technique for generating combined image data that represents a plurality of images having been joined together is well known in the art. For example, an image processing device reads an original in four reading operations to generate data for four partial images. The image processing device joins the partial image data and outputs data for a single combined image. The image processing device sets the layout position for each partial image in the combined image and determines the edges of the partial images to be joined on the basis of detection results of image densities in edge parts of the partial images.

SUMMARY

However, appropriately joining a plurality of images is not a simple process. Two partial images being joined often share common parts, for example. In such cases, if joining the edges of the two images to form a combined image, the combined image includes duplicated common areas. In some cases, the two images being combined have no common parts. If the edges of two images are partially overlapped in this case, a portion of the original will be missing from the generated combined image.

In view of the foregoing, it is an object of the present disclosure to provide a technique for suitably combining a first image with a second image.

In order to attain the above and other objects, the disclosure provides an image processing device. The image processing device includes a processor, and a memory storing computer-readable instructions therein. The computer-readable instructions, when executed by the processor, causing the image processing device to perform: acquiring first image data representing a first image and second image data representing a second image, the first image including a first edge and a first region, the second image including a second edge and a second region; generating, when a first condition is met, first combined image data representing a first combined image by using the first image data and the second image data so that the first region is overlapped with the second region; and generating, when a second condition different from the first condition is met, second combined image data representing a second combined image by using the first image data and the second image data so that the first edge adjoins the second edge.

According to another aspects, the disclosure provides a non-transitory computer readable storage medium storing a set of program instructions installed on and executed by a computer. The program instructions includes acquiring first image data representing a first image and second image data representing a second image, the first image including a first edge and a first region, the second image including a second edge and a second region; generating, when a first condition is met, first combined image data representing a first combined image by using the first image data and the second image data so that the first region is overlapped with the second region; and generating, when a second condition different from the first condition is met, second combined image data representing a second combined image by using the first image data and the second image data so that the first edge adjoins the second edge.

According to still another aspects, the disclosure provide a method. The method includes: acquiring first image data representing a first image and second image data representing a second image, the first image including a first edge and a first region, the second image including a second edge and a second region; generating, when a first condition is met, first combined image data representing a first combined image by using the first image data and the second image data so that the first region is overlapped with the second region; and generating, when a second condition different from the first condition is met, second combined image data representing a second combined image by using the first image data and the second image data so that the first edge adjoins the second edge.

BRIEF DESCRIPTION OF THE DRAWINGS

The particular features and advantages of the disclosure as well as other objects will become apparent from the following description taken in connection with the accompanying drawings, in which:

FIG. 5(A) are schematic diagrams illustrating scanned images;

FIG. 5(B)-5(D) are schematic diagrams illustrating relative positions of a search region and a reference region;

FIG. 5(E) is a schematic diagram illustrating the search region;

FIG. 6 is a flowchart illustrating a process for setting a joining position;

FIG. 7(A) is a diagram showing an example layout of the original relative to a flatbed when a scanning unit reads a left region;

FIG. 7(B) is a diagram showing an example layout of the original relative to the flatbed when the scanning unit reads a right region;

FIG. 8 are diagrams illustrating scanned images;

FIG. 12(A)-12(C) are schematic diagrams illustrating a second embodiment;

DETAILED DESCRIPTION

A. First Embodiment
A-1: Structure of an Image Processing System

Figure 1:
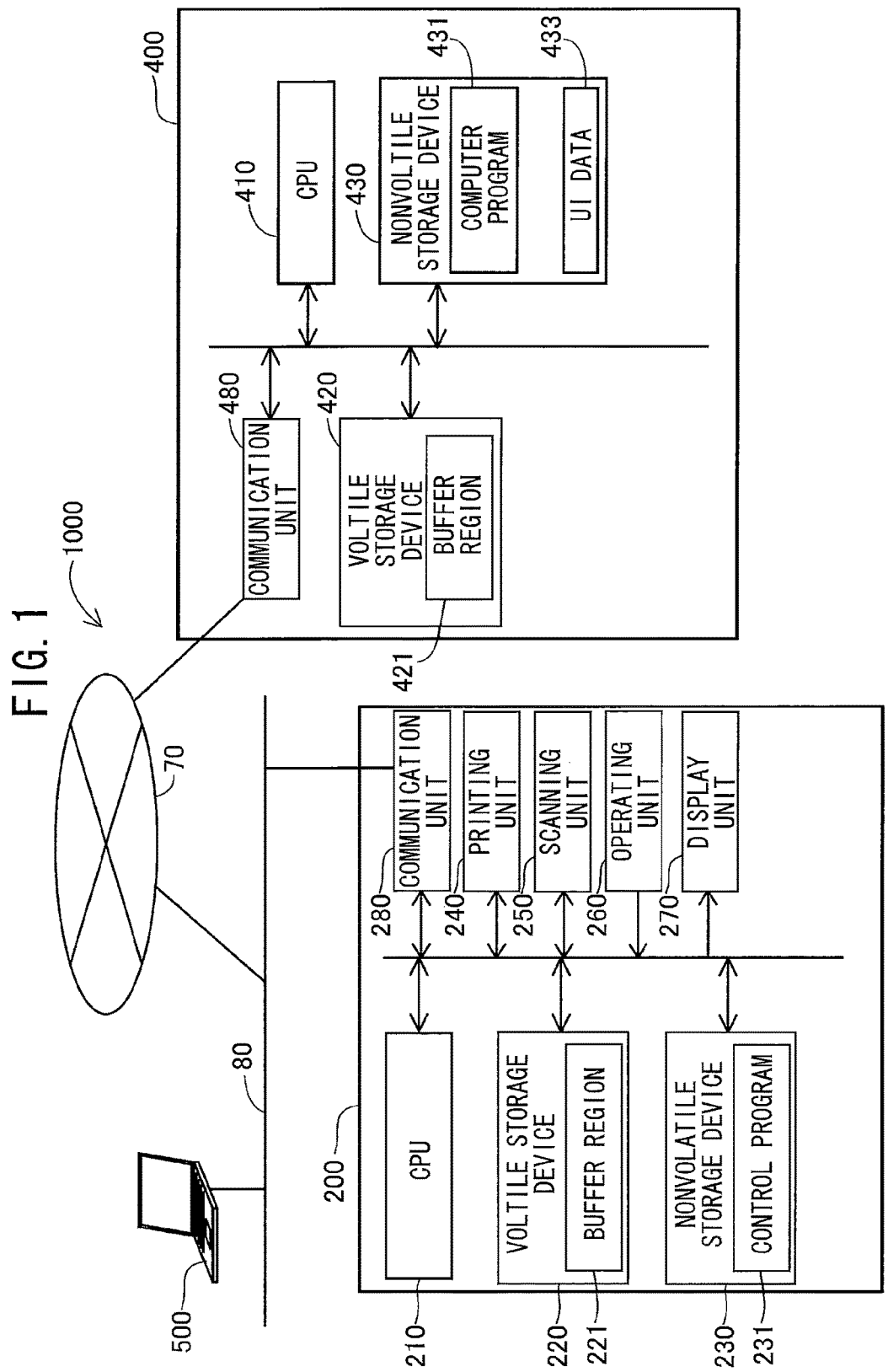
FIG. 1 is a block diagram showing a structure of an image processing system according to a first embodiment.

FIG. 1 is a block diagram showing the structure of an image processing system 1000 according to a first embodiment. The image processing system 1000 is configured of a server 400 functioning as an image processing device, and a multifunction peripheral 200. The server 400 is connected to an Internet 70. The multifunction peripheral 200 is also connected to the Internet 70 via a local area network (LAN) 80. Consequently, the server 400 and the multifunction peripheral 200 can communicate with each other via the LAN 80 and the Internet 70. Further, a personal computer 500 possessed by the user of the multifunction peripheral 200 may be connected to the LAN 80 (The image processing system 1000 may not include the personal computer 500).

The server 400 includes a CPU 410, as an example of the processor, for processing data; a volatile storage device 420, such as DRAM; a nonvolatile storage device 430, such as a hard disk drive or flash memory; and a communication unit 480 including an interface for connecting to the Internet 70 or other networks. The volatile storage device 420 is provided with a buffer region 421 for temporarily storing various intermediate data generated when the CPU 410 performs processes. The nonvolatile storage device 430 stores a computer program 431, and user interface (UI) data 433.

The computer program 431 and the UI data 433 are installed on the server 400 by the administrator of the server 400, for example, by uploading this data to the server 400 through the Internet 70. Alternatively, the computer program 431 and the UI data 433 may be supplied on a DVD-ROM or other storage media and installed on the server 400 by the administrator. The CPU 410 executes the computer program 431 to implement an image process described later.

The multifunction peripheral 200 includes a CPU 210 as an example of a processor, for processing data; a volatile storage device 220, such as DRAM; a nonvolatile storage device 230, such as flash memory or a hard disk drive; a printing unit 240; a scanning unit 250; an operating unit 260, such as a touchscreen, buttons, or the like; a display unit 270, such as a liquid crystal display; and a communication unit 280 for communicating with external devices. The communication unit 280 includes an interface for connecting to the LAN 80 or another network, and an interface for connecting to a USB memory or another external storage device, for example.

The volatile storage device 220 is provided with a buffer region 221 that temporarily stores various data generated when the CPU 210 performs processes. The nonvolatile storage device 230 stores a control program 231.

The printing unit 240 executes printing operations according to an inkjet or laser printing method, for example. The scanning unit 250 produces scan data representing a color or grayscale image by optically reading an original using a photoelectric conversion element such as a CCD (Charge Coupled device) sensor or CMOS (Complementary Metal-Oxide Semiconductor) sensor. The scanning unit 250 is provided with a flatbed 256 and a conveying device 254 (FIG. 4) conveying an original. In the embodiment, a maximum size of an original that the multifunction peripheral 200 can read in one scanning operation (one pass) is larger than an A4 size and smaller than an A3 size. Here, the A4 size and the A3 size are defined by ISO (abbreviation of International Organization for Standardization) 216 for international standard paper sizes. As described later in detail, the multifunction peripheral 200 generates a whole image representing an original whose size is larger than the maximum size (for example, the A3 size original) by combining one set of scan data generated by combining two sets of scan data. Here, one of the two sets of scan data is generated by reading approximate half portion of the original and a remaining one of the two sets of scan data is generated by reading approximate remaining half portion of the original.

The CPU 210 controls the multifunction peripheral 200 by executing the control program 231. For example, the CPU 210 can control the printing unit 240 and the scanning unit 250 to execute a copy process, a print process, and a scan process. Further, the CPU 210 can execute a service use process for accessing the server 400 to use services provided thereby.

A-2: Operations of the Image Processing System

Figure 2:
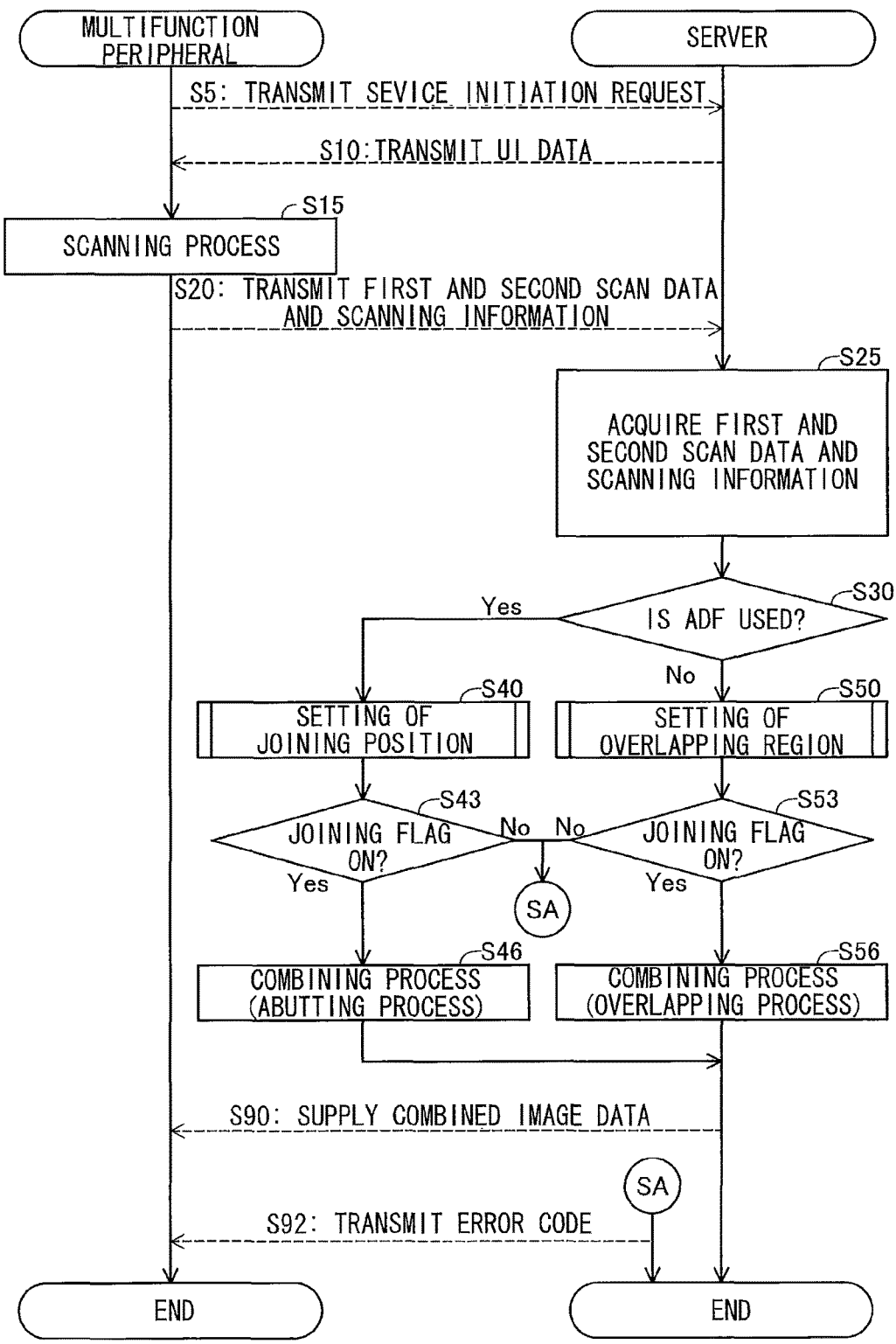
FIG. 2 is a diagram illustrating a sequence of operations performed by the image processing system.

FIG. 2 shows the sequence of operations performed by the image processing system 1000 for an image generation service. The multifunction peripheral 200 initiates the process in FIG. 2 upon receiving a command from the user to use the image generation service provided by the server 400. This service will be described later in greater detail and entails combining a plurality of scanned images represented by scan data obtained through a plurality of passes. As will be described later in greater detail, a plurality of sets of scan data is generated when the scanning unit 250 performs a plurality of passes to read an original that is larger than the maximum size that the scanning unit 250 can read in one pass, for example.

In S5 at the beginning of the process in FIG. 2, the CPU 210 of the multifunction peripheral 200 transmits a service initiation request to the server 400. Upon receiving this request, the CPU 410 of the server 400 selects UI data required for providing the image generation service from the UI data 433 shown in FIG. 1 and in S10 transmits this UI data to the multifunction peripheral 200. The UI data specifically includes window data representing a user interface window (hereinafter called a "UI window"), and control data. The control data includes various data required for the multifunction peripheral 200 to perform a prescribed process, such as the scan process described later in S15, using the UI window. For example, the control data may include data that the multifunction peripheral 200 needs to perform processes that the multifunction peripheral executes, such as, process transmitting scan data to the server 400 in response to a command received from the user via the UI window (see FIG. 4, for example). The data that the multifunction peripheral 200 needs may include the destination address for the scan data.

In S15 the CPU 210 executes a scanning process (hereinafter called a "reading process") to generate a plurality of sets of scan data based on the UT data received in S10. In the reading process of the embodiment, the CPU 210 generates two sets of scan data by reading a first approximate half portion of an original prepared by the user, and subsequently reading the remaining approximate half portion of the original prepared by the user. The scan data generated in the embodiment is RGB image data that includes RGB component values (each value indicating one of 256 gradations between 0 and 255, for example) for each pixel in the image.

The multifunction peripheral 200 according to the embodiment is capable of executing two types of scanning processes. One type of the scanning processes is a scanning process using the conveying device 254 of the scanning unit 250 (hereinafter, this process will be called the "ADF (Auto Document Feeder) reading process"), and another type of the scanning processes is a scanning process using the original platen in the scanning unit 250 (hereinafter, this process will be called the "flatbed reading process"). The CPU 210 displays a UI window (not shown) on the display unit 270 based on the UI data received in S10 prompting the user to select either the ADF reading process or the flatbed reading process. First, a description will be provided for a case in which the user selects the ADF reading process, after which a description will be provided for a case in which the user selects the flatbed reading process.

A-2-1: ADF Reading Process

Figure 3:
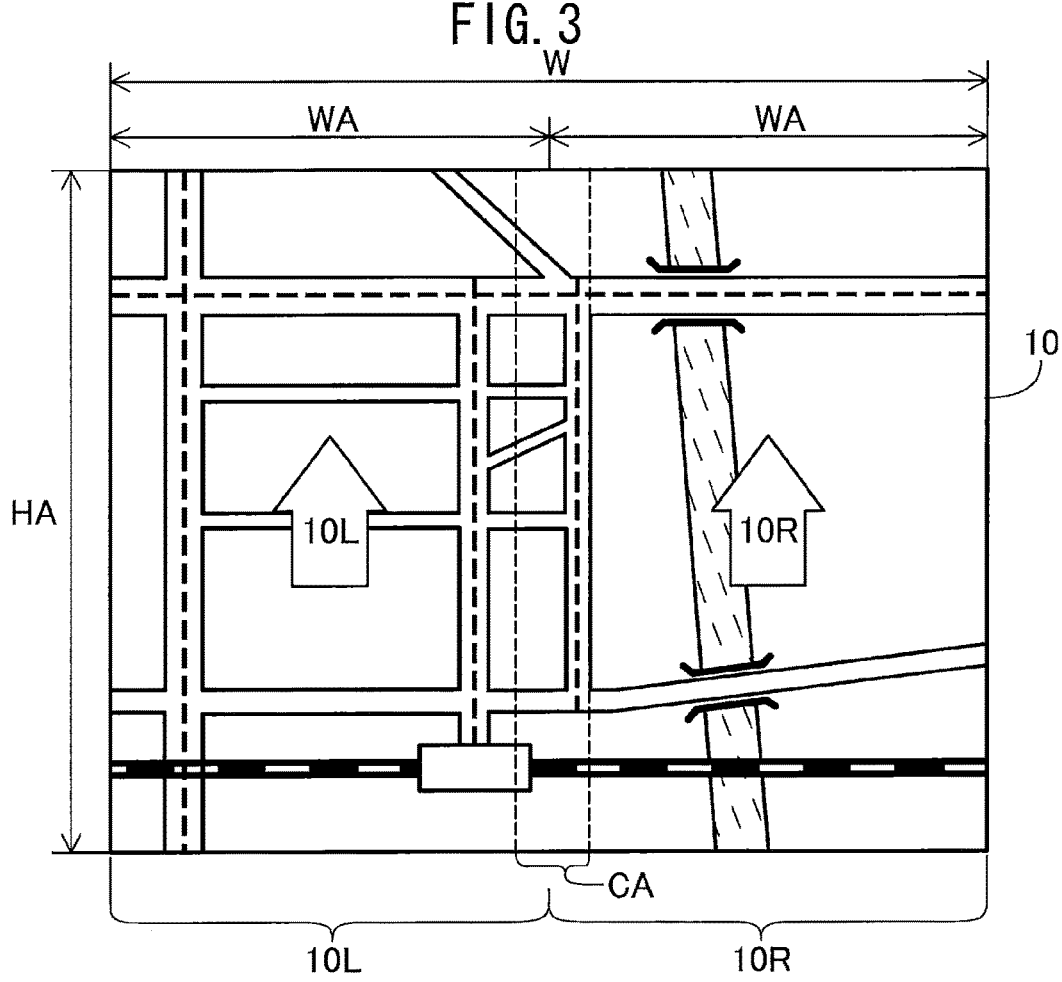
FIG. 3 is a diagram illustrating an example of an original used in the first embodiment.

FIG. 3 shows an example of an original 10 used in this description. The original 10 in FIG. 3 is approximately twice the size (A3 size in this example) of the maximum size of an original that the scanning unit 250 can read in one reading operation (a size slightly larger than A4 size in this example). As shown in FIG. 3, the short-side dimension (dimension orthogonal to the longitudinal dimension) of the original 10 is called the "total height HA," while the longitudinal dimension is called the "total width W." Further, the region on the left side of the original 10 constituting approximately half of the original 10 will be called the left region 10L, while the region of the original 10 on the right side constituting approximately half of the original 10 will be called the right region 10R. The width of each of the images 10L and 10R (i.e., half the total width W) is called a "width WA." Arrows provided in the center of each of the images 10L and 10R denote the direction from the bottom of the image toward the top.

Figure 4:
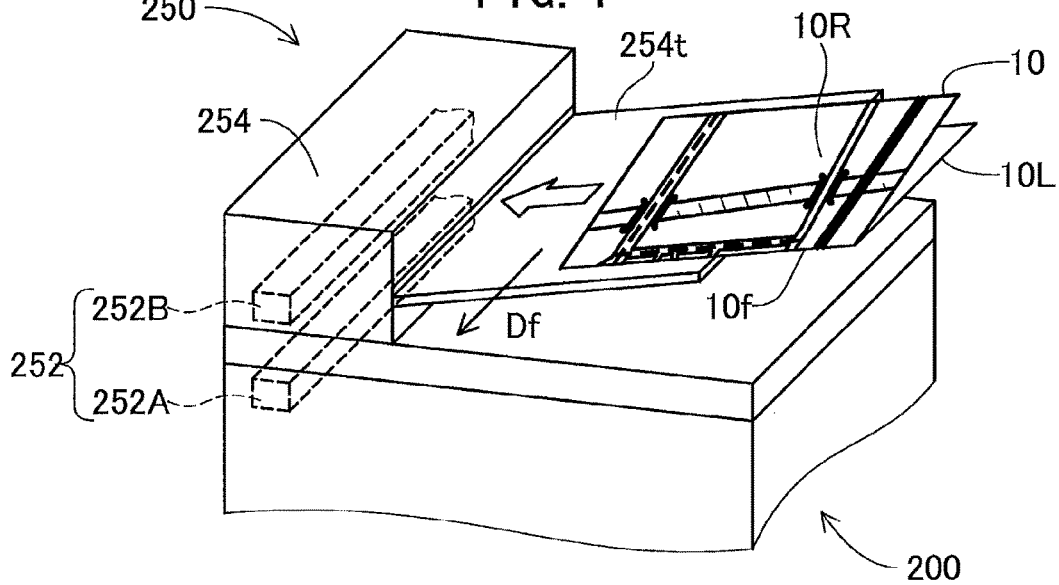
FIG. 4 is an explanatory diagram illustrating an ADF reading process using a conveying device.

FIG. 4 is an explanatory diagram illustrating the ADF reading process. As shown in FIG. 4, the scanning unit 250 includes a conveying device 254 for conveying the original being read, and a reading unit 252. The conveying device 254 is an automatic document feeder (ADF). The reading unit 252 also has a first sensor module 252A and a second sensor module 252B. The sensor modules 252A and 252B are photosensors that optically read an original and are disposed midway along the conveying path of the original conveyed by the conveying device 254. Each of the sensor modules 252A and 252B has a plurality of light-receiving elements arranged in a line extending in a direction that intersects the conveying direction of the original. The first sensor module 252A reads one side of the original, while the second sensor module 252B reads the other side. Thus, the scanning unit 250 can read both sides of an original using two sensor modules 252A and 252B.

The conveying device 254 includes an original tray 254t. When selecting the ADF reading process, the user folds the original 10 in half and places the folded original 10 into an original tray 254t, as illustrated in FIG. 4. At this time, the original 10 must be placed in the original tray 254t such that the crease 10f of the folded original 10 is on the downstream side in a prescribed direction Df relative to the conveying device 254 (hereinafter, this direction will be called the "crease-side direction Df"). While not shown, the CPU 210 displays an information screen on the display unit 270 on the basis of the UI data for guiding the user in placing the folded original in the original tray 254t as shown in FIG. 4 when the user has selected the ADF reading process.

As indicated in FIG. 4, the left region 10R is positioned on one side of the folded original 10, while the right region 10R is positioned on the other side. The user operates the operating unit 260 to input a command through the UI window displayed on the display unit 270 for starting the scanning operation. Upon receiving the start command, the CPU 210 controls the scanning unit 250 to scan both surfaces of the folded original 10 (i.e., the images 10L and 10R) and to generate two sets of scan data representing both surfaces.

FIG. 5(A) illustrates examples of scanned images. FIG. 5(A) shows a first scanned image 20L represented by first scan data, and a second scanned image 20R represented by second scan data. The first scanned image 20L represents the left region 10L of the original 10 (see FIG. 3), while the second scanned image 20R represents the right region 10R of the original 10. The scanned images 20L and 20R are expressed as color values (RGB color values, for example; also called "pixel values") for a plurality of pixels (not shown) of a grid arranged in a first direction D1 and a second direction D2 orthogonal to the first direction D1. While not shown in the drawings, the scanned images 20L and 20R may include margin areas representing areas outside the original 10.

In S20 of FIG. 2, the CPU 210 transmits, to the server 400, the first scan data representing the first scanned image 20L, the second scan data representing the second scanned image 20R, and scanning information representing settings used for the scanning operation. The scanning information includes data indicating whether the scan data was generated using the flatbed reading process or the ADF reading process. In S25 the CPU 410 of the server 400 acquires the first scan data, the second scan data, and the scanning information and stores this data in the buffer region 421.

In S30 the CPU 410 references the scanning information to determine whether the conveying device 254 was used for generating the scan data (i.e., whether the ADF reading process was performed to generate the scan data). Here, it will be assumed that the CPU 410 reaches a YES determination in S30. Later, a description will be given for a case in which the scan data was generated using the flatbed reading process rather than the ADF reading process.

In S40 the CPU 410 sets the joining position for the two scanned images. FIG. 6 is a flowchart illustrating steps in the process for setting the joining position. In S100 of FIG. 6, the CPU 410 acquires first edge data from the first scan data that represents at least part of a first edge, and specifically the downstream edge (i.e., side) in the crease-side direction Df shown in FIG. 4. The edge 22L in FIG. 5(A) is the edge of the first scanned image 20L on the downstream side in the crease-side direction Df (hereinafter called the "first edge 22L"). The CPU 410 identifies the first edge 22L by analyzing the first scanned image 20L. Any edge detection process known in the art, such as a process employing filters or a process employing a Hough transform, may be used to identify the first edge 22L. If the identified first edge 22L is sloped relative to the first direction D1, the CPU 410 executes a skew correction process to rotate the first scanned image 20L until the first edge 22L is aligned with the first direction D1. Next, the CPU 410 acquires data representing an entire pixel line 24L in a single column corresponding to the first edge 22L as first edge data representing the first edge 22L. An enlarged view of the pixel line 24L is provided to the right of the first scanned image 20L in FIG. 5(A). Each box in the pixel line 24L indicated by the letter "P" denotes a single pixel. As will be described later, the CPU 410 finds the joining position by searching the pixel line 24L (hereinafter called the "search region 24L") represented by the first edge data.

In S110 of FIG. 6, the CPU 410 acquires second edge data from the second scan data that represents at least part of a second edge, i.e., the downstream edge in the crease-side direction Df of FIG. 4. The edge 22R in FIG. 5(A) is the edge of the second scanned image 20R on the downstream of the crease-side direction Df (hereinafter called the "second edge 22R"). The CPU 410 identifies the second edge 22R by analyzing the second scanned image 20R. Any edge detection process known in the art may be employed for identifying the second edge 22R. If the identified second edge 22R is sloped relative to the first direction D1, the CPU 410 executes a skew correction process to rotate the second scanned image 20R until the second edge 22R is aligned in the first direction D1. The CPU 410 acquires data representing a central area 24R of a prescribed size in the first direction D1 within a pixel line constituting one column that corresponds to the second edge 22R as second edge data representing part of the second edge 22R. An enlarged view of the central area 24R is shown to the left of the second scanned image 20R in FIG. 5(A). Each box P in the pixel line 24L denotes a single pixel. As will be described below, the central area 24R represented by the second edge data is used as a search reference for the joining position (hereinafter the central area 24R will be called the "reference region 24R").

In S120 of FIG. 6, the CPU 410 sets a comparing position for the reference region 24R relative to the search region 24L to an initial position. FIG. 5(B) shows the relative positions of the search region 24L and the reference region 24R when the reference region 24R is in the initial position. In the embodiment, the comparing position indicates the position of the reference region 24R in the first direction D1. In the initial position, the top pixel of the reference region 24R corresponds to the top pixel in the search region 24L (where the top pixel is the pixel on the upstream end in the first direction D1). Hereinafter, the portion of the search region 24L corresponding to the reference region 24R will be called the "target region 24Li." As shown in FIG. 5(B)-5(E), the density of hatching in the pixels P indicates the color values for the same (i.e., darker hatching represents a larger color value).

In S130 of FIG. 6, the CPU 410 calculates a first similarity S1 by comparing color values in the reference region 24R to color values in the search region 24L. In the embodiment, the first similarity S1 is the ratio of the number SC of similar pixels to the total number Nt of pixels in the target region 24Li (S1=SC/Nt). Here, a similar pixel in the target region 24Li is a pixel having a small difference ΔVP in pixel values to the corresponding pixel in the reference region 24R. The pixel in the reference region 24R that corresponds to the target pixel in the target region 24Li is the pixel having the same position in the first direction D1 as the target pixel among the plurality of pixels in the reference region 24R at the comparing position. For example, pixel Pc in FIG. 5(B) is the pixel in the reference region 24R corresponding to the target pixel Pi. The difference ΔVP between two pixels is expressed as the sum of absolute values of the differences between their three component values. Thus, if the RGB component values of the two pixels being compared are respectively represented as (R1, G1, B1) and (R2, G2, B2), then the difference ΔVP is the sum of the absolute value of (R1-R2), the absolute value (G1-G2), and the absolute value of (B1-B2). A similar pixel is a pixel whose difference ΔVP is smaller than or equal to a prescribed reference TH1. The greater the first similarity S1 calculated above, the more similar the target region 24Li to the reference region 24R.

In S140 of FIG. 6, the CPU 410 determines whether an adjoining condition has been met. The adjoining condition indicates that the image in the target region 24Li is adjacent to the image in the reference region 24R on the upstream side in the second direction D2. In the embodiment, the adjoining condition is satisfied when the first similarity S1 is greater than or equal to a prescribed first threshold T1. If the image in the target region 24Li neighbors the image in the reference region 24R, the first similarity S1 will be high since the image in the target region 24Li resembles the image in the reference region 24R. However, if the image in the target region 24Li does not neighbor the image in the reference region 24R, the first similarity S1 will be low since the image in the target region 24Li does not resemble the image in the reference region 24R. Hence, using the adjoining condition "first similarity S1 ≥first threshold T1" enables the CPU 410 to appropriately determine whether the image in the target region 24Li neighbors the image in the reference region 24R. Hereinafter, a target region 24Li that satisfies the adjoining condition will be called the "adjoining region."

However, if the adjoining condition is not met (S140: NO; S1<T1), in S150 the CPU 410 moves the comparing position a prescribed distance in the first direction D1. The prescribed distance in the embodiment is a distance equivalent to one pixel. However, the distance for moving the comparing position may be a distance equivalent to two or more pixels.

In S160 the CPU 410 determines whether the comparing position moved in S150 is still within a prescribed search region. FIG. 5(E) illustrates the search region SR. In the embodiment, the search region SR is the range of pixels extending from an end e1 of the search region 24L on the upstream side in the first direction D1 to an end e2 of the search region 24L on the downstream side in the first direction D1. If the reference region 24R does not extend outside the search region SR, the CPU 410 determines that the comparing position is still within the search region SR. Thus, the CPU 410 determines that the comparing position remains within the search region SR while the reference region 24R is moved in the first direction D1 from its initial position up until and when an end eR of the reference region 24R on the downstream side in the first direction D1 corresponds to the edge e2 of the search region 24L. The CPU 410 determines that the comparing position is not within the prescribed search region SR when the end eR of the reference region 24R moves past the end e2 of the search region 24L in the first direction D1.

If the comparing position remains within the search region SR after being moved in S150 (S160: YES), the CPU 410 returns to S130 and repeats the process in S130 and S140 for the new comparing position. In this way, the CPU 410 repeatedly determines whether the adjoining condition has been met while moving the reference region 24R within the search region SR, until the adjoining condition is met as illustrated in FIGS. 5(B), 5(C), and 5(D). The target region 24Li in FIG. 5(D) denotes an adjoining region 24Lc that satisfies the adjoining condition.

If the comparing position moves outside the search region SR before the CPU 410 detects a comparing position that satisfies the adjoining condition (i.e., the adjoining region 24Lc; S160: NO), in S190 the CPU 410 sets a joining flag to OFF and ends the process of FIG. 6. The joining flag indicates whether or not to combine the two scanned images. Data representing the joining flag is stored in a storage device of the server 400, such as the volatile storage device 420 or the nonvolatile storage device 430. The joining flag indicates that images are to be joined when ON and that images are not to be joined when OFF.

If the adjoining condition is met (S140: YES), in S170 the CPU 410 sets the joining flag to ON. In S180 the CPU 410 sets the joining position to the current comparing position and stores data representing this position in a storage device of the server 400, such as the volatile storage device 420 or nonvolatile storage device 430. The joining position indicates the position at which the portion of the second edge 22R in the reference region 24R opposes (corresponds to) the portion of the first edge 22L included in the adjoining region 24Lc. Subsequently, the CPU 410 ends the process of FIG. 6. In other words, the joining position of the portion of the second edge 22R in the reference region 24R relative to the first edge 22L.

Returning to FIG. 2, in S43 the CPU 410 reads the joining flag from the storage device and determines whether the joining flag is ON. If the joining flag is OFF (S43: NO), in S92 the CPU 410 transmits an error code to the multifunction peripheral 200 without adjoining (or without abutting) the images and subsequently ends the process of FIG. 2. In this case, the CPU 210 of the multifunction peripheral 200 displays an error message on the display unit 270 and subsequently ends the process of FIG. 2.

Figure 5F:
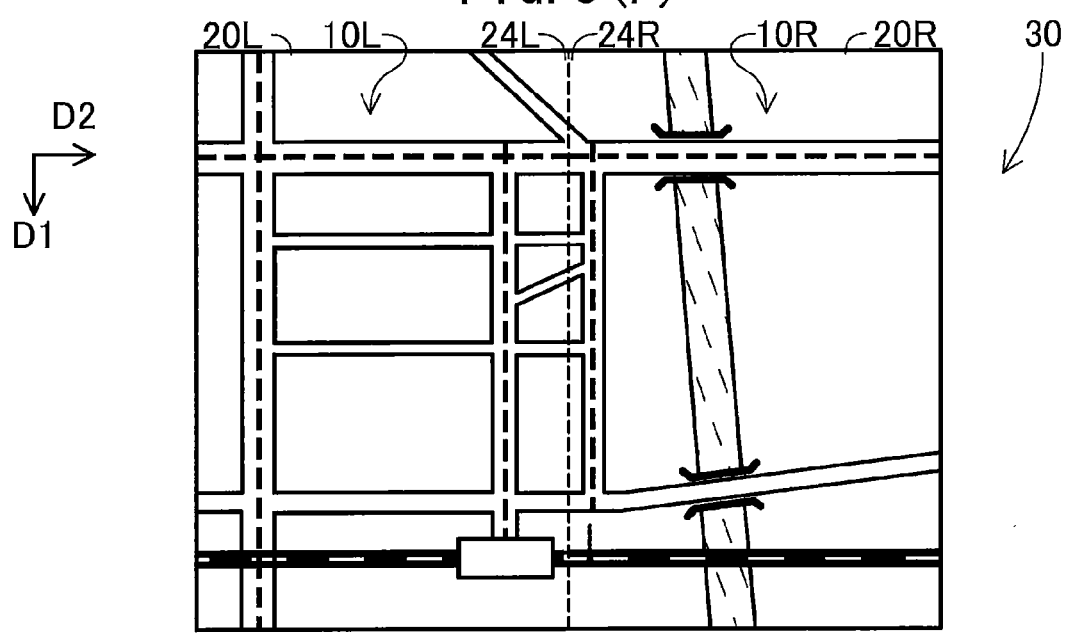
FIG. 5(F) is a schematic diagram showing a combined image.

However, if the joining flag is ON (S43: YES), in S46 the CPU 410 generates combined image data representing an image formed by joining the scanned images 20L and 20R. In the embodiment, the combined image data is generated as a single set of image data representing a single combined image. FIG. 5(F) is a schematic diagram showing a combined image 30 combined in the process of S46. The CPU 410 combines the images in S46 such that the second edge 22R of the second scanned image 20R abuts but does not overlap the first edge 22L of the first scanned image 20L. Hereinafter, the edges 22L and 22R will also be called "joining edges 22L and 22R." Here, the joining position set in S180 of FIG. 6 is the position of the second edge 22R in the second scanned image 20R relative to the first edge 22L in the first scanned image 20L with respect to the first direction D1. This joining position is the position at which the reference region 24R (see FIG. 5(D)) is abutted with the adjoining region 24Lc. Hence, the CPU 410 can generate combined image data representing a suitable combined image 30. Hereinafter, combined image data representing a combined image, such as the combined image 30, obtained by combining but not overlapping a first scanned image and second scanned image will be called "second combined image data."

In S90 of FIG. 2, the CPU 410 transmits the combined image data generated in S46 to the multifunction peripheral 200. Upon receiving this combined image data, the CPU 210 of the multifunction peripheral 200 stores the data in the nonvolatile storage device 230 and notifies the user that combined image data has been received. Accordingly, the user is free to use the combined image data for any purpose. For example, the user can issue a command to the multifunction peripheral 200 to print the combined image 30 using the combined image data.

A-2-2: Flatbed Reading Process

Next, the process performed when reading an original placed on a flatbed of the multifunction peripheral 200 will be described. This process will be described for the same original 10 shown in FIG. 3. FIGS. 7(A) and 7(B) are explanatory diagrams illustrating the flatbed reading process. The flatbed 256 of the scanning unit 260 is used for supporting an original. The flatbed 256 is revealed when the conveying device 254 is lifted to its open position. FIGS. 7(A) and 7(B) are views of the flatbed 256 from above when the conveying device 254 is open. Directions indicated by arrows D1 and D2 in FIGS. 7(A) and 7(B) are acquired when applying directions D1 and D2 for the scanned image to the flatbed 256. The flatbed 256 is configured of a transparent plate (a glass plate, for example). While not shown in the drawings, the first sensor module 252A (see FIG. 4) is arranged beneath the flatbed 256. The first sensor module 252A extends in the second direction D2. The first sensor module 252A can read nearly the entire flatbed 256 while moving in the first direction D1.

The longitudinal dimension of the flatbed 256 is represented by a longitudinal length L1 in FIG. 7, while the short side dimension of the flatbed 256 is represented by a short side length L2. In the embodiment, the longitudinal length L1 of the flatbed 256 is slightly longer (a few millimeters, for example) than the longitudinal dimension of an A4-size sheet (297 mm). The short side length L2 of the flatbed 256 is also slightly larger (a few millimeters, for example) than the short side dimension of a letter-size sheet (215.9 mm). Here, a letter-size sheet is defined by ANSI/ASME (American National Standards Institute/American Society of Mechanical Engineers) Y14.1. In the embodiment, the maximum size of an original that can be read in one reading operation in the embodiment is larger than an A4-size and smaller than an A3-size sheet. Specifically, the scanning unit 250 reads an area whose longitudinal dimension is slightly larger than the longitudinal dimension of an A4-size sheet and whose short side dimension is slightly larger than the short side dimension of a letter-size sheet, and generates image data representing an image for the size of this area.

To read the A3-size original 10 described with reference to FIG. 3, the scanning unit 250 reads the left region 10L and the right region 10R separately. FIG. 7(A) shows an example layout of the original 10 relative to the flatbed 256 when the scanning unit 250 reads the left region 10L, while FIG. 7(B) shows an example layout of the original 10 relative to the flatbed 256 when the scanning unit 250 reads the right region 10R. As shown in FIGS. 7(A) and 7(B), the original 10 is placed on the flatbed 256 such that a portion CA in the approximate longitudinal center region of the A3-size original 10 (hereinafter called the "center part CA") is included in both scanned images. Further, in the embodiment, the conveying device 254 is coupled with the far side of the flatbed 256 (the side upstream in the second direction D2). Hence, the portion of the original 10 extending from the flatbed 256 is arranged on the downstream side of the flatbed 256 in the second direction D2. Thus, the direction toward the top of the original 10 (the direction of the arrow indicating the right region 10R) when the scanning unit 250 reads the right region 10R (see FIG. 7(B)) is opposite the direction toward the top of the original 10 (the direction of the arrow indicating the left region 10L) when the scanning unit 250 reads the left region 10L (see FIG. 7(A)).

While not shown in the drawings, when the flatbed reading process has been selected, in S15 of FIG. 2 the CPU 210 displays an information screen on the display unit 270 based on the UI data for guiding the user to place one side of the original on the flatbed 256, as illustrated in FIG. 7(A). When the user subsequently selects a scan button in the information screen, the CPU 210 controls the scanning unit 250 to read the original and to generate the first scan data representing the left region 10L. Next, the CPU 210 displays an information screen (not shown) on the display unit 270 based on the UI data for guiding the user to place the other side of the original on the flatbed 256, as illustrated in FIG. 7(B). When the user again selects the scan button in the information screen, the CPU 210 controls the scanning unit 250 to read the original and to generate the second scan data representing the right region 10R.

FIG. 8 illustrates an example of scanned images, including a first scanned image 20La represented by the first scan data, and a second scanned image 20Ra represented by the second scan data. As described with reference to FIGS. 7(A) and 7(B), the top of the right region 10R in the second scanned image 20Ra is on the opposite side of the top of the left region 10L in the first scanned image 20La. In S20 of FIG. 2, the CPU 210 transmits the first scan data representing the first scanned image 20La and the second scan data representing the second scanned image 20Ra to the server 400. The CPU 210 also transmits scanning information to the server 400 including information indicating that the scan data was generated through a flatbed reading process. In this case, the CPU 410 determines in S30 that the ADF was not used (S30: NO) and advances to S50.

Figure 9:
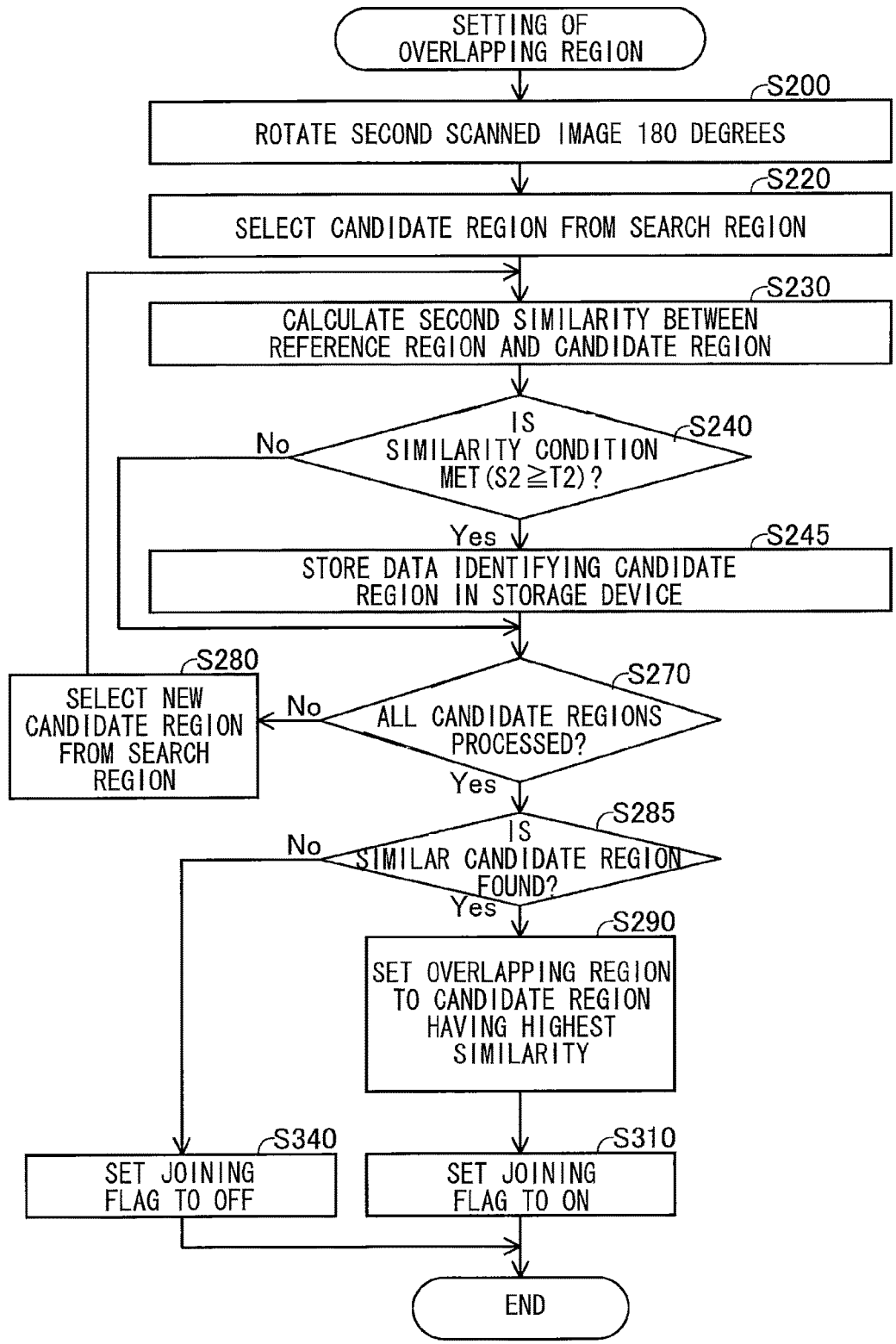
FIG. 9 is a flowchart illustrating a process for setting the overlapping region.
Figure 10:
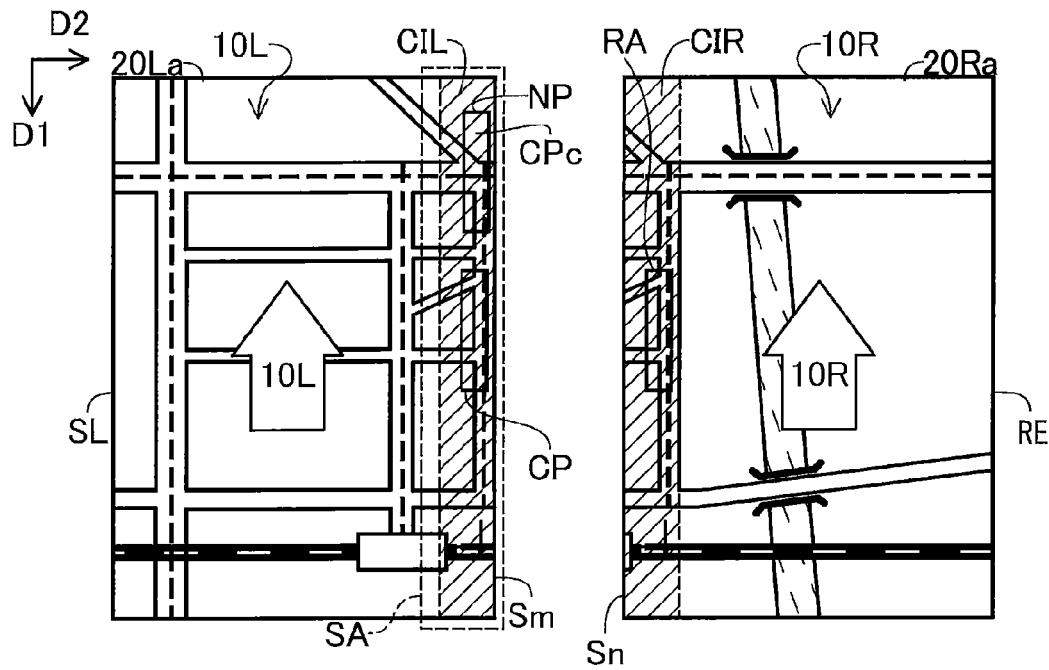
FIG. 10 is a schematic diagram showing a first scanned image and a rotated second scanned image.

In S50 the CPU 410 executes a process for setting an overlapping region. FIG. 9 is a flowchart illustrating steps in the process for setting the overlapping region. In S200 of FIG. 9, the CPU 410 rotates the second scanned image 20Ra 180 degrees. FIG. 10 is a schematic diagram showing the first scanned image 20La and the rotated second scanned image 20Ra. At this time, the top of the left region 10L in the first scanned image 20La matches the top of the right region 10R in the second scanned image 20Ra, as shown in FIG. 10.

Note that the first scanned image 20La may include a margin area. Sometimes the left region 10L is skewed in the first scanned image 20La relative to directions D1 and D2. In such cases, the CPU 410 executes the same skew correction process described in S100 and S110 of FIG. 6. For example, the CPU 410 may execute an edge detection process known in the art to identify the left edge SL (i.e., side SL) of the left region 10L. If the identified left edge SL is sloped relative to the first direction D1, the CPU 410 rotates the first scanned image 20La so that the left edge SL is aligned in the first direction D1. Similarly, if the right region 10R in the second scanned image 20Ra is skewed, the CPU 410 rotates the second scanned image 20Ra so that the right edge RE is aligned with the first direction D1.

FIG. 10 also depicts a center image CIL in the first scanned image 20La and a center image CIR in the second scanned image 20Ra with hatching. These center images CIL and CIR represent the horizontal center part CA of the original 10 in FIG. 3. The center image CIL in the first scanned image 20La includes a right edge Sm of the first scanned image 20La, while the center image CIR in the second scanned image 20Ra includes a left edge Sn of the second scanned image 20Ra. As will be described later, the right edge Sm of the first scanned image 20La is superimposed on the second scanned image 20Ra, and the left edge Sn of the second scanned image 20Ra is superimposed on the first scanned image 20La. Hereinafter, these edges Sm and Sn will be called "superimposed edges Sm and Sn."

A reference region RA is also depicted in the second scanned image 20Ra. The reference region RA is a predetermined partial area of the second scanned image 20Ra and is set to an area included in the center image CIR.

A search region SA is also depicted in the first scanned image 20La. The search region SA is a predetermined partial area of the first scanned image 20La. In the embodiment, the search region SA is a rectangular region that includes the entire right edge Sm of the first scanned image 20La that is superimposed over the second scanned image 20Ra. The search region SA is set so as to include the center image CIL of the first scanned image 20La.

As described above, the center image CIL of the first scanned image 20La is the same as the center image CIR in the second scanned image 20Ra. At this time, the CPU 410 searches the search region SA that includes the center image CIL of the first scanned image 20La for an area resembling the reference region RA. Upon finding an area that resembles the reference region RA, the CPU 410 sets this area as a overlapping region. CP corresponding to the reference region RA. The CPU 410 then joins the first scanned image 20La and the second scanned image 20Ra so that the reference region RA overlaps the overlapping region CP.

More specifically, in S220 of FIG. 9, the CPU 410 selects a candidate region CPc from the search region SA in the first scanned image 20La (see FIG. 10). The size and shape of the candidate region CPc are set based on the reference region RA. First, the CPU 410 arranges a frame NP having the same size and shape as the reference region RA over the search region SA so as to overlap at least part of the same. In other words, part of the frame NP may lie outside the search region SA. In the embodiment, the position of the frame NP is selected from a range of positions in which at least part of the frame NP overlaps the search region SA such that the length in the first direction D1 of the portion of the search region SA included in the frame NP is greater than or equal to a prescribed first length threshold, and the length in the second direction D2 of the portion of the search region SA included in the frame NP is greater than or equal to a prescribed second length threshold (where both the first and second length thresholds are greater than 0). The area within the frame NP that overlaps the search region SA is selected as the candidate region CPc. A plurality of candidate regions that differ from each other in their position in at least one of the directions D1 and D2 may be selected from the search region SA. In S220 of FIG. 9, the CPU 410 selects one unprocessed candidate region as the process target. Hereinafter, the candidate region selected for processing will be called the "target candidate region."

In S230 of FIG. 9, the CPU 410 calculates a second similarity S2 between the reference region RA and the candidate region CPc. The second similarity S2 is calculated in S230 according to the same equation used to calculate the first similarity S1 in S130 of FIG. 6. That is, the second similarity S2 is the ratio of the number SCa of similar pixels to the total number Nta of pixels in the candidate region CPc (S2=SCa/Nta). Here, a similar pixel in the candidate region CPc is a pixel having a small difference $\Delta$VP in pixel values to the corresponding pixel in the reference region RA. The pixel in the reference region RA that corresponds to the target pixel in the candidate region CPc is the pixel in the reference region RA aligned with the target pixel when the image in the candidate region CPc is superimposed over the image in the reference region RA such that the frame NP used to identify the candidate region CPc is aligned with the outer edges of the reference region RA. The difference $\Delta$VP between the two pixels is the same as the difference ΔVP used for calculating the first similarity S1. A similar pixel is a pixel whose difference ΔVP is smaller than or equal to the prescribed reference TH1. The greater the second similarity S2 calculated above, the more similar the candidate region CPc to the reference region RA.

In S240 of FIG. 9, the CPU 410 determines whether a similarity condition has been met. The similarity condition determines whether the candidate region CPc represents an image similar to the image in the reference region RA. The similarity condition in the embodiment requires that the second similarity S2 is greater than or equal to a second threshold T2. Using this type of similarity condition, the CPU 410 can suitably determine whether the image in the candidate region CPc is similar to the image in the reference region RA.

When the similarity condition is met (S240: YES), in S245 the CPU 410 stores data identifying the candidate region CPc in a storage device, such as the volatile storage device 420 or the nonvolatile storage device 430, as data for identifying a candidate region similar to the reference region RA (hereinafter called a "similar candidate region"). Data identifying the similar candidate region (hereinafter called "similar candidate region data") may be data representing the position of the pixel in the upper-left corner of the frame NP defining the candidate region CPc and the width in the second direction D2 and height in the first direction D1 of the frame NP defining the candidate region, for example. After storing this data, the CPU 410 advances to S270 described below.

However, if the similarity condition is not met (S240: NO), the CPU 410 skips step S245 and advances directly to S270.

In S270 the CPU 410 determines whether all candidate regions in the search region have been processed. If there remain unprocessed candidate regions (S270: NO), in S280 the CPU 410 selects a new (another) candidate region from the search region. The CPU 410 then returns to S230 and executes the same process on the new target candidate region. In the embodiment, the position of the frame NP is selected by shifting the frame NP one pixel at a time in the first direction D1 from its position in the upper-right corner. After the frame NP has reached the furthest downstream position in the first direction D1, the position of the frame NP in the second direction D2 is moved one pixel leftward and its position in the first direction D1 is moved back to the top. Thereafter, the frame NP is again shifted one pixel at a time in the first direction D1. By moving the position of the frame NP in this way, all possible candidate regions are selected from the entire search region SA.

When the above process has been completed for all candidate regions in the search region SA (S270: YES), in S285 the CPU 410 references the similar candidate region data in the storage device to determine whether at least one similar candidate region was found. If at least one similar candidate region was found (S285: YES), in S290 the CPU 410 sets the candidate region having the highest similarity among the one or more similar candidate regions that were found as the overlapping region CP, and stores data identifying this overlapping region CP in a storage device such as the volatile storage device 420 or the nonvolatile storage device 430. The data identifying the overlapping region CP (hereinafter called the "overlapping region data") may have the same format as the similar candidate region data. Setting a candidate region as the overlapping region CP is equivalent to setting the position of the second scanned image 20Ra relative to the first scanned image 20La. In S310 the CPU 410 sets the joining flag to ON and ends the process in FIG. 9. However, if a similar candidate region was not found (S285: NO), in S340 the CPU 410 sets the joining flag to OFF and ends the process in FIG. 9.

The candidate region with the highest similarity has a high probability of representing the same image as the reference region RA. Therefore, by employing this candidate region as the overlapping region CP, the CPU 410 can generate suitable combined image data by overlapping the reference region RA with the overlapping region CP.

In S53 of FIG. 2, the CPU 410 reads the joining flag from the storage device and determines whether the joining flag is ON. If the joining flag is OFF (S53: NO), in S92 the CPU 410 transmits an error code to the multifunction peripheral 200 without joining the images, and subsequently ends the process of FIG. 2. In this case, the CPU 210 of the multifunction peripheral 200 displays an error message on the display unit 270 and subsequently ends the process of FIG. 2.

Figure 11:
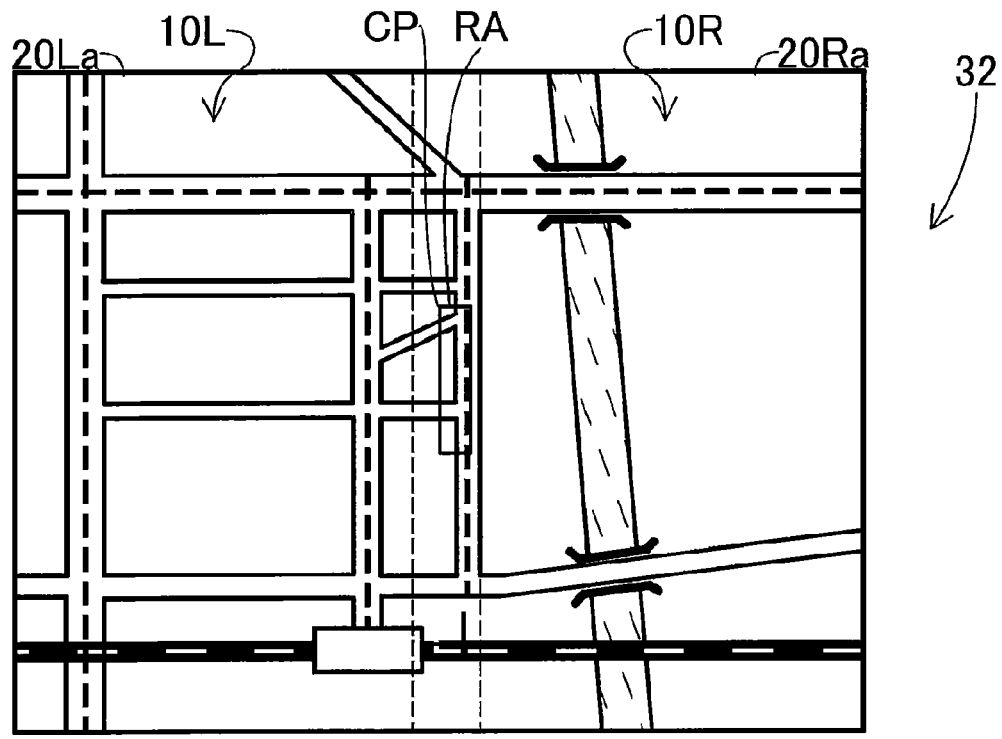
FIG. 11 is a schematic diagram of a combined image.

However, when the joining flag is ON (S53: YES), in S56 the CPU 410 reads the overlapping region data from the storage device and generates combined image data representing a combined image obtained by joining the first scanned image 20La with the second scanned image 20Ra. In the embodiment, the combined image data is generated as a single set of image data representing a single combined image. FIG. 11 is a schematic diagram of a combined image 32. In S56 the images are combined by placing the overlapping region CP in the first scanned image 20La over the reference region RA in the second scanned image 20Ra. In this way, the CPU 410 can generate combined image data representing a suitable combined image 32. Note that the color values for pixels in the region where the two scanned images 20La and 20Ra overlap may be set to the color values of the pixels in a prescribed scanned image (the first scanned image 20La, for example). Alternatively, the color values for pixels in the region where the two scanned images 20La and 20Ra overlap may be set to values obtained on the basis of both color values for pixels in the first scanned image and the color values for pixels in the second scanned image (average color values, for example). In S90 the CPU 410 supplies the combined image data to the multifunction peripheral 200. Hereinafter, combined image data representing the combined image obtained by placing part of the second scanned image over the first scanned image (the combined image 32, for example) will be called the "first combined image data."

As described above, two processes can be employed in the embodiment to generate combined image data representing a single combined image. S56 of FIG. 2 is the first combining process (hereinafter also called an "overlapping process"), while S46 of FIG. 2 is the second combining process (hereinafter called an "abutting process"). In the first combining process of S56, the CPU 410 generates the first combined image data representing the combined image 32 (see FIG. 11) in which the first scanned image 20La and the second scanned image 20Ra are joined by positioning the reference region RA of the second scanned image 20Ra over the overlapping region CP in the first scanned image 20La (see FIG. 10). In the second combining process of S46, the CPU 410 generates the second combined image data representing the combined image 30 (see FIG. 5(F)) by combining the scanned images 20L and 20R such that the second edge 22R of the second scanned image 20R abuts but does not overlap the first edge 22L of the first scanned image 20L (see FIG. 5(A)). By executing these combining processes based on the conditions described in FIG. 2, the CPU 410 can suitably combine the first scanned image with the second scanned image.

Conditions C1 and C2 below must be satisfied in order to execute the first combining process in the embodiment (the overlapping process of S56 in FIG. 2).
First condition C1: the image in the overlapping region CP of the first scanned image 20La (see FIG. 10) and the image in the reference region RA of the second scanned image 20Ra must satisfy the similarity condition (S240 in FIG. 9: YES, S53 in FIG. 2: YES).
Second condition C2: the first and second scan data must be generated according to the flatbed reading process (S30 in FIG. 2: NO).

As described with reference to FIGS. 7(A) and 7(B), the flatbed 256 is smaller in size than the original 10 in the embodiment. Hence, in order for the second condition C2 to be satisfied, the first scan data must be generated according to one flatbed reading process, and the second scan data must be generated according to a separate flatbed reading process.

Requiring the first condition C1 (similarity condition), the server 400 can generate suitable combined image data since the reference region RA can be overlapped on a overlapping region CP that is suitable to the reference region RA. Further, when a overlapping region CP that satisfies the similarity condition exists in the first scanned image 20La, by requiring the second condition C2 (flatbed reading process), the server 400 can generate suitable combined image data using the overlapping region CP.

In the embodiment, the following two conditions C3 and C4 must be met in order to execute the second combining process (the abutting process in S46 of FIG. 2).
Third condition C3: The adjoining condition must be met, whereby the target region 24Li that includes at least part of the first edge 22L in the first scanned image 20L (see FIG. 5) represents an image neighboring the image in the reference region 24R that includes at least part of the second edge 22R of the second scanned image 20R (S140: YES in FIG. 6, S43: YES in FIG. 2).
Fourth condition C4: The ADF reading process must be executed when generating the first and second scan data (S30: YES in FIG. 2).

In this way, the third condition C3 (adjoining condition) can be used to generate suitable combined image data in which the reference region 24R abuts but does not overlap the adjoining region 24Lc resembling the reference region 24R. Further, when an adjoining region 24Lc that meets the adjoining condition may be present in the first scanned image 20L, the fourth condition C4 (ADF reading process) can be used to generate suitable combined image data with the adjoining region 24Lc.

Note that the second sensor module 252B may be omitted from the example shown in FIG. 4. In this case, one of the left region 10L and the right region 10R of the original 10 is read in a first ADF reading process, while the other is read in a second ADF reading process. The fourth condition C4 is still satisfied in this case. The number of ADF reading processes is equivalent to the number of times the conveying device 254 conveys the original. A single ADF reading process generates scan data by conveying an original one time. If the same original is read on one side, then the original is flipped over and the other side is read, the number of ADF reading processes is two.

In the embodiment, the size and shape of the reference region RA (see FIG. 10) and the overlapping region CP used in the first combining process (the overlapping process in S56 of FIG. 2) differ from the size and shape of the reference region 24R (see FIG. 5(D)) and the adjoining region 24Lc used in the second combining process (the abutting process in S46 of FIG. 2).

Specifically, the length in the second direction D2 (i.e., the direction orthogonal to the joining edges 22L and 22R) for the reference region 24R and the adjoining region 24Lc used in the second combining process (the abutting process) is extremely short, while the length in the first direction D1 (i.e., the direction parallel to the joining edges 22L and 22R) is long. Thus, the reference region 24R and the adjoining region 24Lc have a rectangular shape like a long thin line that runs parallel to the joining edges 22L and 22R. The reference region 24R and the adjoining region 24Lc are given this shape, since it is only necessary to search for the joining position in the second combining process, that is, the position in the direction parallel to the joining edges 22L and 22R, while it is not necessary to search for a position in the direction orthogonal to the joining edges 22L and 22R. Note that the lengths of the adjoining region 24Lc and the reference region 24R in the second direction D2 may be greater than a length equivalent to one pixel, such as the length of N pixels, where N is an integer between 2 and 9.

In the first combining process (the overlapping process), on the other hand, it is necessary to search for the position of the overlapping region CP (see FIG. 10) in both the first direction D1 and the second direction D2. Hence, the dimensions of the regions RA and CP in both the directions D1 and D2 are greater than the dimension of the regions 24Lc and 24R (see FIG. 5(D)) in the second direction D2. By not setting at least one of the dimensions of the regions RA and CP in the directions D1 and D2 too small, it is possible to suitably search for the overlapping region CP representing the same image as the reference region RA. Further, the dimensions of the regions RA and CP in the first direction D1 are shorter than the dimensions of the regions 24Lc and 24R (see FIG. 5(D)) in the first direction D1. Hence, by not setting the number of pixels in the regions RA and CP too large, it is possible to reduce the image-processing load. Note that the regions RA and CP have a rectangular shape that is both shorter and wider than the regions 24Lc and 24R in FIG. 5(D).

In the first embodiment, the reference for similarity of images satisfying the adjoining condition (S140 of FIG. 6; first threshold T1) is lower than the reference for similarity of images satisfying the similarity condition (S240 of FIG. 9; second threshold T2) for the following reason. The image in the adjoining region 24Lc (see FIG. 5(D)) found in the process of FIG. 6 is not exactly the same as the image in the reference region 24R, but rather is an image neighboring the image in the reference region 24R (i.e., an image that could neighbor the image in the reference region 24R). However, the image in the overlapping region CP (see FIG. 10) found in the process of FIG. 9 is the same as the image in the reference region RA. Hence, the degree of similarity required for the overlapping region CP is greater than the degree of similarity required for the adjoining region 24Lc. Accordingly, the reference of similarity in the similarity condition of S240 in FIG. 9 (the second threshold T2) is preferably higher than the reference of similarity of images satisfying the adjoining condition in S140 of FIG. 6 (the first threshold T1). Since second threshold T2>first threshold T1 in the embodiment, it is possible to perform suitable searches, for both an adjoining region 24Lc neighboring the search region 24L (see FIG. 5(D)) and a overlapping region CP resembling the reference region RA (see FIG. 10).

Further, the search region SA that is searched for the overlapping region CP (see FIG. 10) is wider than the search region 24L that is searched for the adjoining region 24Lc (see FIG. 5(D)). In other words, the area of the search region SA is greater than the area of the search region 24L. More specifically, the dimension of the search region SA in the second direction D2 (i.e., the length in the direction orthogonal to the right edge Sm) is greater than the same dimension of the search region 24L for the following reason. It is necessary to find the position of the overlapping region CP in both directions D1 and D2. By setting the dimensions of the search region SA long in both directions D1 and D2, it is possible to suitably search for a overlapping region CP whose position is uncertain in both directions D1 and D2. On the other hand, it is necessary to search for the position of the adjoining region 24Lc only in the first direction D1, and not in the second direction D2. Thus, searches for the adjoining region 24Lc can be suitably performed in a search region 24L having a short dimension in the second direction D2.

B. Second Embodiment

FIG. 12(A)-12(C) illustrate a second embodiment of the image process. FIG. 12(A) shows an additional step for the flowchart of FIG. 2. FIG. 12(B) is an explanatory diagram illustrating a smoothing filter used in S48 of FIG. 12(A). FIG. 12(C) is a schematic diagram of a combined image 30b. The second embodiment differs from the first embodiment of FIG. 2 in that step S48 has been added between steps S46 and S90. The remaining steps of the image process according to the second embodiment are identical to those in FIG. 2 according to the first embodiment. Further, the hardware structure of the image processing system that executes the image process is identical to the structure shown in FIG. 1.

After combined image data has been generated in the abutting process (S46 of FIG. 2), in S48 of FIG. 12(A), the CPU 410 executes a process for smoothing the color values in the adjoining portions of the joining edges 22L and 22R. FIG. 12(B) gives an example of a smoothing filter applied to the pixel being processed (hereinafter called the "target pixel Px"). As shown in FIG. 12(B), a processed color value Vx of the target pixel Px is set to the average value of unprocessed color values Va-Vh of the eight pixels surrounding the target pixel Px (i.e., the eight neighboring pixels). This type of smoothing filter is also called a moving average filter. In the embodiment, this smoothing process is performed on the color values for all color components (red, green, and blue in this case).

A target region As indicated by hatching in FIG. 12(C) is the region targeted in the smoothing process. In the embodiment, the target region As is a rectangular region that includes the joining edges 22L and 22R in their entirety and has a prescribed width Ws in the direction orthogonal to the joining edges 22L and 22R. The CPU 410 executes the smoothing process described with reference to FIG. 12(B) over the entire target region As. Thus, the CPU 410 can reduce any noticeable traces of joining the first edge 22L to the second edge 22R. For example, when the original 10 has been folded in half as illustrated in FIG. 4, a partial image on the crease 10f may be missing from both the scanned images 20L and 20R. This partial image on the crease 10f is equivalent to the portion between the joining edges 22L and 22R. The width of this partial image in the second direction D2 (i.e., the dimension orthogonal to the joining edges 22L and 22R) may be equivalent to approximately 1-10 pixels. If this partial image is missing, the image may have an unnatural appearance in the joined region of the joining edges 22L and 22R. Thus, the process according to the second embodiment can mitigate any unnatural appearance in the image at this joined portion between the joining edges 22L and 22R, even when a partial image between the joining edges 22L and 22R is missing.

C. Third Embodiment

Figure 13:
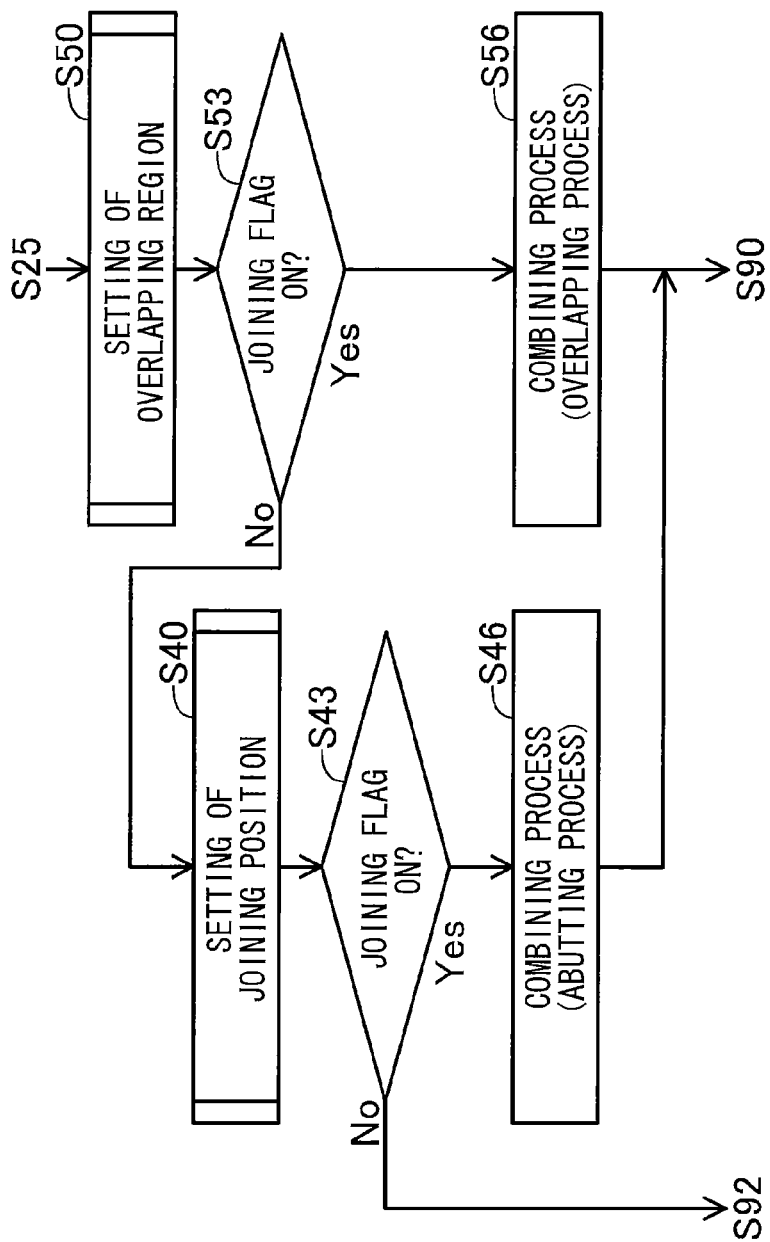
FIG. 13 is a part of a flowchart illustrating steps to be replaced with steps shown in FIG. 2 according to a third embodiment.

FIG. 13 illustrates a third embodiment of the image process. FIG. 13 shows steps to be replaced with the part of steps in the flowchart shown in FIG. 2. The third embodiment differs from the first embodiment of FIG. 2 in that steps between S25 and S90 have been performed according to the flowchart illustrated in FIG. 13. In other words, the third embodiment differs from the first embodiment in conditions for executing the first combining process (or, overlapping process in S56) and conditions for executing the second combining process (or, abutting process in S46). The remaining steps of the image process according to the third embodiment are identical to those in FIG. 2 according to the first embodiment. Further, the hardware structure of the image processing system that executes the image process is identical to the structure shown in FIG. 1.

In FIG. 13, the same reference numerals (step number) are designated for steps identical to those of the first embodiment. After acquiring scan data in S25, in S50 the CPU 410 sets an overlapping region. In S53 the CPU 410 determines whether the joining flag is ON. If the joining flag is ON, that is, if a suitable overlapping region was detected, then in S56 the CPU 410 executes the first combining process (the overlapping process) to generate combined image data. Subsequently, the CPU 410 advances to S90.

However, if a suitable overlapping region was not detected (S53: NO), in S40 the CPU 410 sets a joining position. In S43 the CPU 410 determines whether the joining position is ON. If the joining flag is ON, that is, if a suitable joining position (i.e., the adjoining region 24Lc) has been detected, in S46 the CPU 410 executes the second combining process (the abutting process) to generate combined image data. Subsequently, the process advances to S90. However, if a suitable joining position (i.e., the adjoining region 24Lc) was not detected (S43: NO), the process advances to S92.

In the third embodiment, the first condition C1 described above must be met (i.e., a overlapping region CP that satisfies the similarity condition must be detected) in order to execute the first combining process (the overlapping process of S56). Unlike the first embodiment, however, the second embodiment eliminates the second condition C2 that restricts the method in which the scan data is generated. Hence, the CPU 410 can generate suitable combined image data when a suitable overlapping region CP has been detected, regardless of which method was used for generating the scan data.

Further, both the third condition C3 described above and a fifth condition C5 must be met in order to execute the second combining process (the abutting process of S46).

Third condition C3: identical to the third condition C3 described above (i.e., an adjoining region 24Lc that satisfies the adjoining condition must be detected).

Fifth condition C5: the first condition C1 must not be met (S53: NO). In other words, a overlapping region that satisfies the similarity condition was not detected.

Thus, when the first condition C1 is not satisfied, i.e., when the condition for executing the first combining process (the overlapping process) has not been met, the joining flag set to OFF in S340. However, the value of the joining flag ("OFF") is provisionally set and thus can be changed. That is, the condition for generating combined image data by the second combination process (the abutting process S46) is determined in S40. In S40, the value of the joining flag can be changed to ON. Accordingly, the CPU 410 can generate suitable combined image data when a target region 24Li that satisfies the adjoining condition (i.e., the adjoining region 24Lc) has been detected, even when a overlapping region CP that satisfies the similarity condition was not detected in the first scanned image. Further, unlike the first embodiment, the CPU 410 can generate suitable combined image data independent of the method by which scan data was generate, since the fourth condition C4 that limits which method can be used to generate scan data has been omitted.

D. Fourth Embodiment

Figure 14:
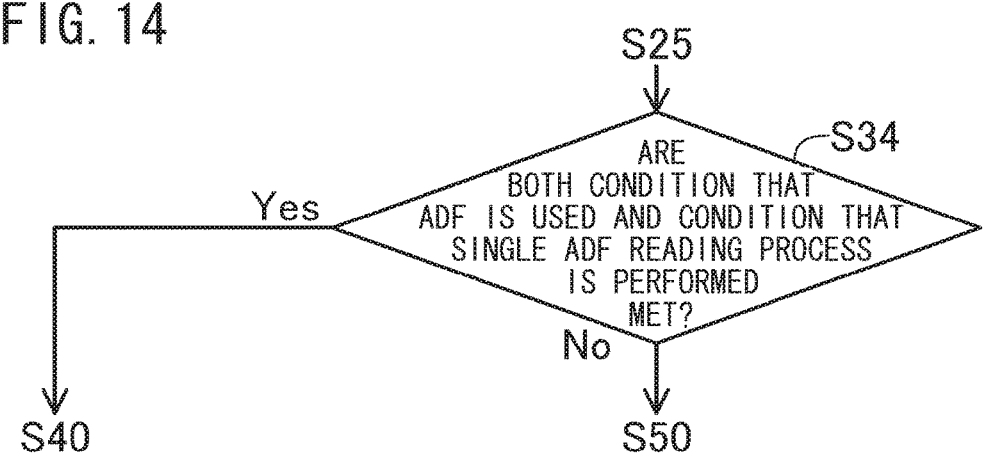
FIG. 14 is a part of a flowchart illustrating a steps to be replaced with a step shown in FIG. 2 according to a fourth embodiment.

FIG. 14 illustrates a fourth embodiment of the image process. FIG. 14 shows a step to be replaced with the step in the flowchart shown in FIG. 2. That is, the fourth embodiment differs from the first embodiment of FIG. 2 in that step S30 has been replaced with step S34 illustrated in FIG. 14. The remaining steps of the image process according to the fourth embodiment are identical to those in FIG. 2 according to the first embodiment. Further, the hardware structure of the image processing system that executes the image process is identical to the structure shown in FIG. 1.

In S34 the CPU 410 determines whether the conveying device 254 was used to generate the scan data and whether a single ADF reading process (that is, a double sided reading process) was performed to simultaneously generate first scan data and second scan data. Specifically, in S15 of FIG. 2, the user can select either double-sided reading or single-sided reading from the UI window when choosing the ADF reading process. In S20 of FIG. 2, the CPU 210 of the multifunction peripheral 200 transmits the scan data to the server 400, including information indicating which reading method was selected. The CPU 410 of the server 400 then makes the determination in S34 (FIG. 14) on the basis of the scan data received in S20. The CPU 410 advances to S40 when a YES determination is reached (S34: YES) and advances to S50 when a NO determination is reached (S34: NO).

In the fourth embodiment, the third condition C3, the fourth condition C4, and a sixth condition C6 must be met in order to execute the second combining process (the abutting process in S46 of FIG. 2).

Third condition C3: identical to the third condition C3 described above (an adjoining region 24Lc that satisfies the adjoining condition must be detected)

Fourth condition C4: identical to the fourth condition C4 described above (the ADF reading process must have been used)

Sixth condition C6: a double-sided read must be executed in a single ADF reading process to generate both the first image data and second image data (S34 of FIG. 14: YES)

Thus, in the fourth embodiment the sixth condition C6 is added to the conditions described in the first embodiment.

Since the scanning unit 250 reads both the top and bottom surfaces of the folded original 10 as described with reference to FIG. 4, the first and second scanned images cannot include common center images CIL and CIR (see FIG. 10), i.e., a suitable overlapping region CP does not exist in the first scanned image when the sixth condition C6 is met. Therefore, suitable combined image data can be generated using the second combining process (the abutting process in S46 of FIG. 2).

Further, in the fourth embodiment the first condition C1 and a seventh condition C7 must be met in order to execute the first combining process (the overlapping process in S56 of FIG. 2).

First condition C1: identical to the first condition C1 described above (a overlapping region CP that satisfies the similarity condition must be detected)

Seventh condition C7: either the flatbed reading process must have been executed to generate both the first and second scan data, or the ADF reading process must have been executed in a single-sided read to generate the first image data while a separate ADF reading process must have been executed in another single-sided read to generate the second image data (S34 of FIG. 14: NO)

When the seventh condition C7 is satisfied, the first and second scanned images can include a common center images CIL, and CIR, respectively; i.e., a suitable overlapping region CP can exist in the first scanned image. When the conveying device 254 is used to generate scan data, for example, the user folds the original 10 such that the left region 10L and the center image CIL are arranged on the same side and the side is small enough for the scanning unit 250 to read. Subsequently, the user folds the original 10 such that the right region 10R and the center image CIR are arranged on the same side and the side is small enough for the scanning unit 250 to read. Accordingly, two sets of scan data representing the same first scanned image 20La and the second scanned image 20Ra described in the example of FIG. 10 can be generated through two ADF reading processes. Hence, suitable combined image data can be generated according to the first combining process (the overlapping process in S56 of FIG. 2).

E. Fifth Embodiment

Figure 15:
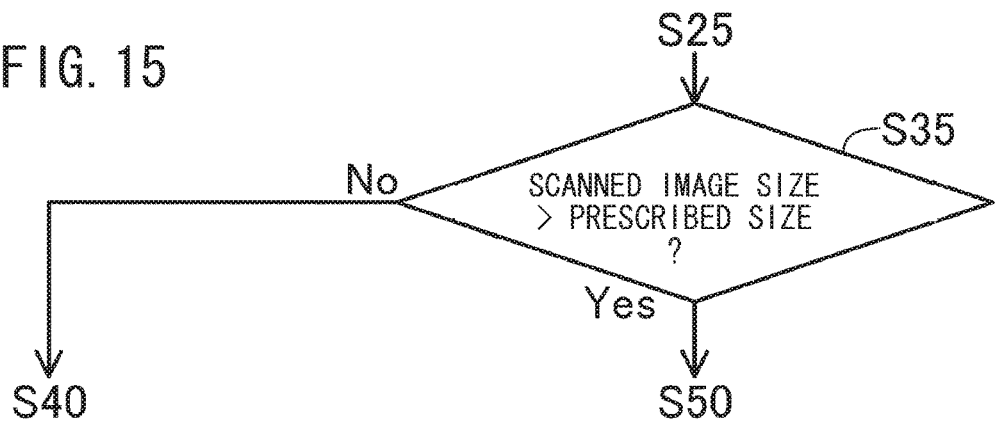
FIG. 15 is a part of a flowchart illustrating a steps to be replaced with a step shown in FIG. 2 according to a fifth embodiment.

FIG. 15 illustrates a fifth embodiment of the image process. FIG. 15 shows a step to be replaced with the step in the flowchart shown in FIG. 2. That is, the fifth embodiment differs from the first embodiment of FIG. 2 in that step S30 has been replaced with step S35 illustrated in FIG. 14. The remaining steps of the image process according to the fifth embodiment are identical to those in FIG. 2 according to the first embodiment. Further, the hardware structure of the image processing system that executes the image process is identical to the structure shown in FIG. 1.

In S35 the CPU 410 determines whether the size of at least one of the first scanned image and the second scanned image exceeds a prescribed size (A4 size in this case). Here, the CPU 410 uses, as the size of the scanned image, the size of the scanned image remaining after eliminating the margin areas. For example, the CPU 410 identifies the outline of the portion of the scanned image representing the original 10 using a well-known edge detection process. The CPU 410 then uses the size of the identified outline as the size of the scanned image. Further, the CPU 410 determines that the size of the scanned image exceeds the prescribed size when the length of the scanned image in the first direction D1 exceeds the length of the prescribed size in the first direction D1 or when the length of the scanned image in the second direction D2 exceeds the length of the prescribed size in the second direction D2. The CPU 410 advances to S50 when reaching a YES determination in S35, and advances to S40 when reaching a NO determination.

In the fifth embodiment, the first condition C1 and an eighth condition C8 must be satisfied in order to execute the first combining process (the overlapping process in S56 of FIG. 2).

First condition C1: identical to the first condition C1 described above (a overlapping region CP satisfying the similarity condition must be detected)

Eighth condition C8: the size of at least one of the first scanned image and the second scanned image must exceed the prescribed size (A4 size in this example; S35: YES)

When the eighth condition C8 is satisfied (for example, when scan data representing the first scanned image 20La and the second scanned image 20Ra in FIG. 10 is generated), it is highly probable that the scanned image possessing a size greater than the prescribed size includes a common partial image (the center image CIL, for example) with the other scanned image. Therefore, suitable combined image data can be generated using the first combining process (the overlapping process in S56 of FIG. 2).

Further, in the fifth embodiment the third condition C3 and a ninth condition C9 must be satisfied in order to execute the second combining process (the abutting process in S46 of FIG. 2).
Third condition C3: identical to the third condition C3 described above (an adjoining region 24Lc satisfying the adjoining condition must be detected)
Ninth condition C9: the eighth condition C8 must not be satisfied (S35: NO); that is, the size of both the first and second scanned images must not exceed the prescribed size (A4 size in this example)

When the ninth condition C9 is satisfied (for example, when scan data representing the scanned images 20L and 20R in FIG. 5(A) is generated), the two scanned images will not include common parts. Therefore, suitable combined image data can be generated according to the second combining process (the abutting process in S46 of FIG. 2).

Here, half the size of the original size of the original 10 may be employed as the prescribed size.

F. Sixth Embodiment

Figure 16:
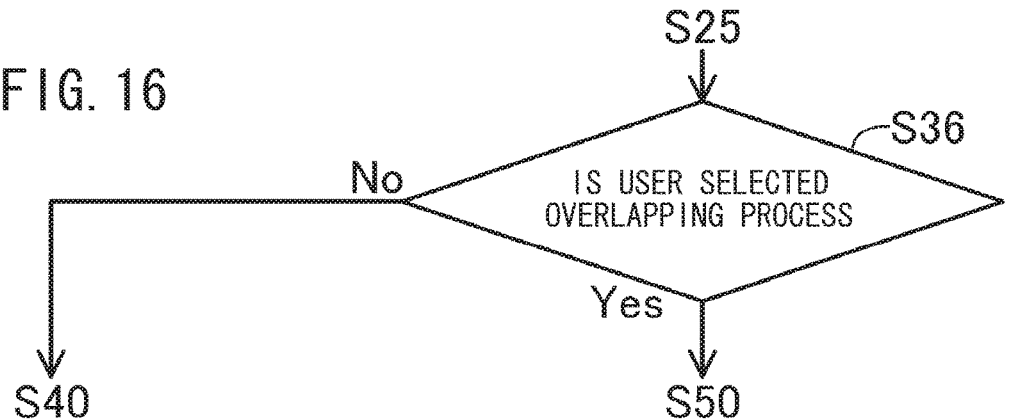
FIG. 16 is a part of a flowchart illustrating a steps to be replaced with a step shown in FIG. 2 according to a sixth embodiment.

FIG. 16 illustrates a sixth embodiment of the image process. FIG. 16 shows a step to be replaced with the step in the flowchart shown in FIG. 2. That is, the sixth embodiment differs from the first embodiment of FIG. 2 in that step S30 has been replaced with step S36 illustrated in FIG. 16. The remaining steps of the image process according to the sixth embodiment are identical to those in FIG. 2 according to the first embodiment. Further, the hardware structure of the image processing system that executes the image process is identical to the structure shown in FIG. 1.

In S36 the CPU 410 determines whether the user has selected the first combining process (the overlapping process in S56 of FIG. 2). More specifically, in S15 of FIG. 2 the user can select whether to execute the first combining process (the overlapping process) or the second combining process (the abutting process) in the UI window. In S20 of FIG. 2, the CPU 210 of the multifunction peripheral 200 transmits scan data including information indicating which combining method was selected to the server 400. The CPU 410 of the server 400 then makes the determination in S36 based on the scan data received in S20. The CPU 410 advances to S50 when reaching a YES determination and advances to S40 when reaching a NO determination.

In the sixth embodiment, the first condition C1 and a tenth condition C10 must be met in order to execute the first combining process (the overlapping process in S56 of FIG. 2).
First condition C1: identical to the first condition C1 described above (a overlapping region CP that satisfies the similarity condition must be detected) Tenth condition C10: the user must have selected the first combining process (the overlapping process) for generating the combined image data (S36: YES)

When the tenth condition C10 is satisfied, suitable combined image data can be generated using the user-selected first combining process (the overlapping process in S56 of FIG. 2).

Further, the third condition C3 and an eleventh condition C11 must be satisfied in order to execute the second combining process (the abutting process in S46 of FIG. 2).
Third condition C3: identical to the third condition C3 described above (an adjoining region 24Lc satisfying the adjoining condition must be detected) Eleventh condition C11: the tenth condition C10 must not be satisfied (S36: NO); in other words, the user must have selected the second combining process (the abutting process) to generate combined image data.

When the eleventh condition C11 is satisfied, suitable combined image data can be generated by executing the user-selected second combining process (the abutting process).

G. Seventh Embodiment

Figure 17:
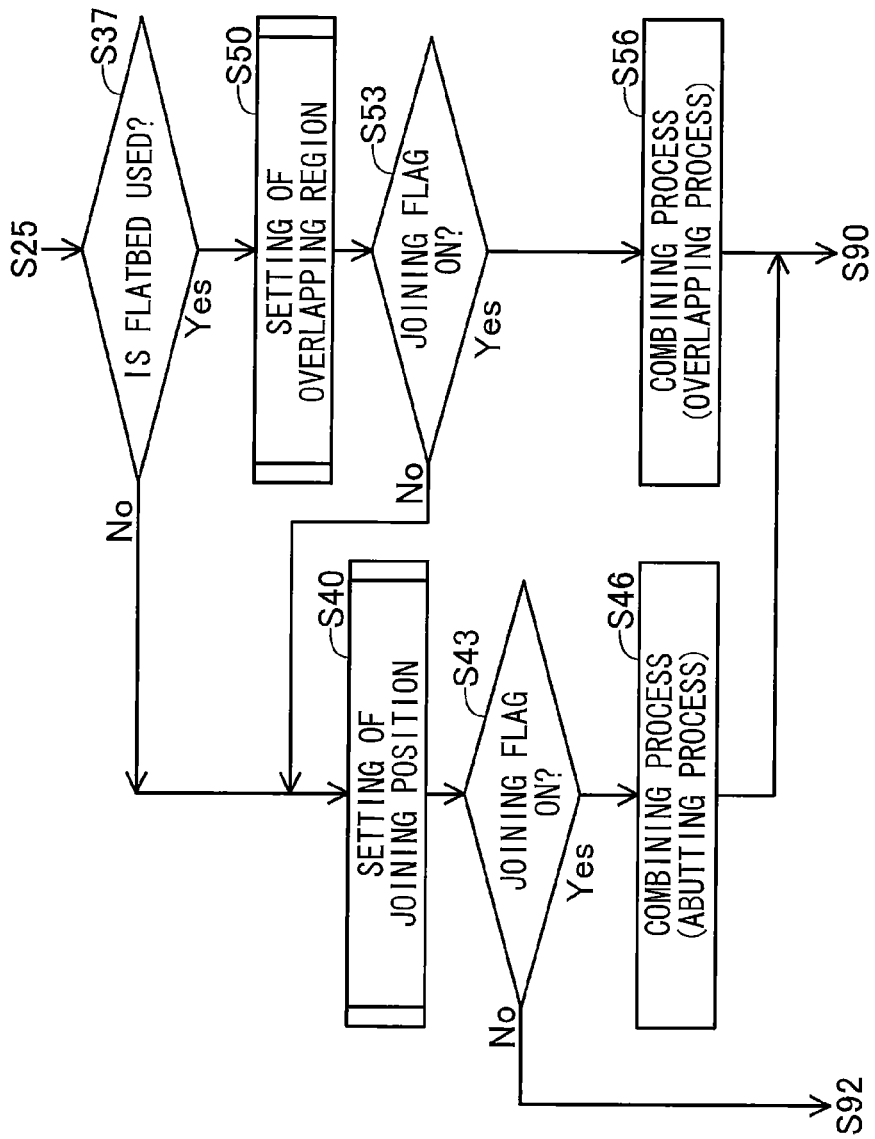
FIG. 17 is a part of a flowchart illustrating steps to be replaced with steps shown in FIG. 2 according to a seventh embodiment.

FIG. 17 illustrates a seventh embodiment of the image process. FIG. 17 shows steps to be replaced with the part of steps in the flowchart shown in FIG. 2. The seventh embodiment differs from the third embodiment of FIG. 13 in that a step S35 is added between S25 and S50. The remaining steps of the image process according to the seventh embodiment are identical to those in FIG. 2 according to the third embodiment shown in FIG. 13. Further, the hardware structure of the image processing system that executes the image process is identical to the structure shown in FIG. 1.

In S37 the CPU 410 determines whether the flatbed 256 was used to generate the scan data (i.e., whether the scan data was generated according to the flatbed reading process). In the seventh embodiment, the size of the flatbed 256 is smaller than the size of the original 10, as illustrated in FIG. 7. Hence, in order to generate scan data according to the flatbed reading process, the first scan data is generated in one flatbed reading process and the second scan data is generated in a separate flatbed reading process. The CPU 410 advances to S50 upon reaching a YES determination. The process from S53 is identical to that described in the third embodiment with reference to FIG. 13. The CPU 410 advances to S40 upon reaching a NO determination in S37.

In the seventh embodiment, the first condition C1 and a twelfth condition C12 must be satisfied in order to execute the first combining process (the overlapping process in S56).
First condition C1: identical to the first condition C1 described above (a overlapping region CP that satisfies the similarity condition must be detected) Twelfth condition C12: the first scan data must be generated according to one flatbed reading process and the second scan data must be generated according to another flatbed process (S37: YES)

When the twelfth condition C12 is satisfied, there is a high probability that one of the scanned images includes a common partial image (the center image CIL, for example) with the other scanned image. Therefore, suitable combined image data can be generated according to the first combining process (the overlapping process in S56 of FIG. 2).

Further, the condition for executing the second combining process (the abutting process of S46) in the fifth embodiment requires that the condition for executing the first combining process (the overlapping process of S56) be not met (S37: NO or S53: NO) and that the third condition C3 be met (S43: YES).

Thus, when the twelfth condition C12 is met (S37: YES) and a overlapping region CP satisfying the similarity condition (see FIG. 10) was not detected (S53: NO), suitable combined image data can be generated according to the second combining process (the abutting process). As described with reference to FIG. 5, the first and second images are not likely to include a common partial image when the twelfth condition C12 is not met (S37: NO).

Hence, suitable combined image data can be generated according to the second combining process (the abutting process) in this case.

H. Variations of the Embodiments (1) When calculating the similarities S1 and S2, any method capable of calculating a value representing the degree of similarity between two images may be employed in place of the method described in the embodiments. For example, the difference ΔVP between pixel values may be the difference between values of a specific color component for the pixels (the luminance component, for example).

(2) Various other regions may be used as the search region 24L in place of the example shown in FIG. 5(A). For example, a partial region that includes only part of the first edge 22L may be used as the search region 24L. Further, the CPU 410 may analyze the first scanned image 20L and set the search region 24L on the basis of the results of this analysis. For example, the CPU 410 may set the search region 24L to a region in the first scanned image 20L having widely varying color values at different positions. A partial region that includes at least part of the first edge 22L in the first scanned image 20L may be employed as the search region 24L.

Further, various other regions may be employed as the reference region 24R in place of the example shown in FIG. 5(A). For example, a partial region that includes the entire second edge 22R may be used as the reference region 24R. Further, the CPU 410 may analyze the second scanned image 20R and set the reference region 24R based on the results of this analysis. For example, the CPU 410 may set the reference region 24R to a region in the second scanned image 20R whose color values change greatly at different positions. A partial region of the second scanned image 20R that includes at least part of the second edge 22R in the scanned image 20R can be used as the reference region 24R.

(3) While the adjoining condition for determining whether the target region 24Li is the adjoining region 24Lc is satisfied in the embodiments when the first similarity S1 is greater than or equal to the first threshold T1, the adjoining condition may be any condition that determines when the adjoining region 24Lc represents an image neighboring the image in the reference region 24R. For example, the CPU 410 may calculate the first similarity S1 for all comparing positions and may use the comparing position having the largest first similarity S1 as the joining position. In other words, the adjoining condition may require that the target region 24Li have the largest first similarity S1 among first similarities S1 for all target regions 24Li in the search region 24L. According to another condition that may be employed, lines are detected in images of the reference region 24R and the target region 24Li using a well-known edge detection process. Here, the adjoining condition requires that the line detected in the reference region 24R be connected to the line detected in the target region 24Li. In any case, a predetermined condition may be employed as the adjoining condition.

(4) Various processes may be employed in place of the process shown in FIG. 9 for setting a overlapping region CP that represents an image resembling the reference region RA (see FIG. 10). For example, the CPU 410 may set the candidate region CPc that is initially found to satisfy the similarity condition as the overlapping region CP.

(5) Various other regions may be employed as the search region SA instead of the search region SA described in FIG. 10. For example, a partial region that includes only the center portion of the right edge Sm in the first direction D1 may be used as the search region SA. Further, the CPU 410 may analyze the first scanned image 20La and set the search region SA based on the results of this analysis. For example, the CPU 410 may set a region in the first scanned image 20La whose color values vary greatly at different positions as the search region 24L. Similarly, any of various regions may be employed as the reference region RA instead of the reference region RA described in FIG. 10. For example, a region that includes at least part of the left edge Sn may be used as the reference region RA. Further, the CPU 410 may analyze the second scanned image 20Ra and set the reference region RA based on the results of this analysis. For example, a region in the second scanned image 20Ra whose pixel values vary greatly at different positions may be set as the reference region RA. In any case, various regions that express a common partial image in the two scanned images may be employed as the regions SA and RA.

(6) While the similarity condition for determining whether the candidate region CPc is the overlapping region CP requires that the second similarity S2 be greater than or equal to the second threshold T2 in the embodiments, any condition that determines whether the image in the reference region RA is similar to the image in the candidate region CPc may be used. For example, step S240 may be omitted from FIG. 9. In this case, the similarity condition may be a condition that the candidate region CPc have the largest second similarity S2 among second similarities S2 in all candidate regions of the search region SA. Further, the CPU 410 may identify feature points from the image (endpoints of a line or branching points, for example) and perform pattern matching using the distribution of these feature points to determine whether the two images are similar. In any case, a predetermined condition may be used as the similarity condition.

(7) The condition for executing the first combining process in the embodiments (the overlapping process in S56 of FIG. 2; hereinafter called the "first condition") may be replaced with various other conditions. For example, it is possible to use a condition obtained by combining two or more of the first conditions selected from the plurality of embodiments described above.

(8) The condition for executing the second combining process in the embodiments (the abutting process in S46 of FIG. 2; hereinafter called the "second condition") may be replaced with various other conditions. For example, it is possible to use a condition obtained by combining two or more of the second conditions selected from the plurality of embodiments described above. Further, the second condition may include the condition that the first condition is not met. In other words, the CPU 410 may determine whether the first condition has been met, and may determine whether the second condition has been met when the first condition is not met. In this way, combined image data can be suitably generated on the basis of whether a overlapping region CP that satisfies the similarity condition was detected.

(9) The area subjected to the smoothing process in S48 of FIG. 12(A) may be only the center portion with respect to the first direction D1 in the joining area in which the joining edges 22L and 22R are joined. The area subjected to the smoothing process may be a region that includes at least the joining parts of the joining edges 22L and 22R.

Further, while the filter in FIG. 12(B) is used for the smoothing process of S48 described in the second embodiment, any process for smoothing color values may be employed. For example, a filter that applies weighted averages to pixels neighboring the target pixel Px may be employed (a Gaussian filter, for example). Here, a weight of each neighboring pixel may be defined so that the shorter the distance between the target pixel Px and the neighboring pixel, the larger the weight corresponding to the neighboring pixel is. The smoothing process in S48 of FIG. 12(A) may also be applied to the other embodiments described above. In any case, the color components subjected to the smoothing process may be only some color components (the luminance component, for example).

(10) When reading an original 10 that has been folded as in the example of FIG. 4, the user may be allowed to place the original 10 such that the crease 10f is facing any direction. Further, one side of the folded original 10 may be read in an ADF reading process according to a single-sided read while the other side is read in a separate ADF reading process according to a single-sided read. In any case, the CPU 410 may identify the joining edge of the first scanned image and the joining edge of the second scanned image by analyzing the two scanned images. For example, the CPU 410 may execute a process to set joining positions for a plurality of combinations (or all combinations) of edges in the first scanned image and edges in the second scanned image and may use the combination having the largest first similarity S1.

(11) The order and arrangement of steps in the image process may be modified in various ways. For example, the skew correction process executed in S100 and S110 of FIG. 6 and in S200 of FIG. 9 may be executed by the multifunction peripheral 200 (the CPU 210, for example). Further, the CPU 410 may select the search region 24L (FIG. 5(A)) and the search region SA (FIG. 10) from the scanned image that includes the right region 10R, and may select the reference region 24R and reference region RA from the scanned image that includes the left region 10L. Further, step S200 may be omitted from FIG. 9, and the CPU 410 may instead set the rotated angles of the first and second scanned images after analyzing the images. For example, the CPU 410 may set overlapping regions for four rotated angles, including 0°, 90°, 180°, and 270°, and may use the rotated angle at which the overlapping region has the largest second similarity S2 among the four overlapping regions.

(12) In the embodiments described above, the two sets of scan data used for generating combined image data are first scan data and second scan data obtained by reading a single original. However, the two sets of scan data may be obtained by reading two or more originals.

(13) In the embodiments described above, two sets of image data used to generate combined image data are two sets of scan data that the scanning unit 250 of the multifunction peripheral 200 generates by reading an original. However, the two sets of image data may be two sets of scan data generated by a scanning device that includes the flatbed 256 but not the conveying device 254 or a scanning device that includes the conveying device 254 but not the flatbed 256. In either case, the scanning device preferably transmits scanning information to the server 400 in addition to the two sets of scan data. The scanning information preferably includes data used for determining whether either of a first condition for executing the first combining process (S56 of FIG. 2) and a second condition for executing the second combining process (S46 of FIG. 2) have been met. Alternatively, the two sets of image data may be generated by a digital camera photographing an original. The image data may be data generated by any reading device that optically reads a target object and generates image data representing the object. Here, the reading device itself may transmit the image data to the server 400 or another device (a computer, for example) connected to the reading device may transmit the image data to the server 400. In either case, it is preferable that data used for determining whether either of the first and second conditions is met be transmitted to the server 400 in addition to the image data.

(14) The processes executed by the CPU 410 of the server 400 in the embodiments described above (for examples, processes in S25-S90 of FIG. 2) may be executed by the CPU 210 of the multifunction peripheral 200 instead. In this case, the server 400 is not needed, and the multifunction peripheral 200 may execute the processes in FIG. 2 alone. Further, the processes executed by the CPU 410 of the server 400 may be executed by a CPU (not shown) in the personal computer 500 (see FIG. 1) connected to the multifunction peripheral 200. The CPU of the personal computer 500 may perform these processes by executing a scanner driver program installed on the personal computer 500, for example. Further, the server 400 may be configured of a single computer, as in the embodiments, or may be configured of a computer system including a plurality of computers.

Part of the configuration implemented in hardware in the embodiments described above may be replaced with software and, conversely, part of the configuration implemented in software in the embodiments may be replaced with hardware. For example, the functions of the CPU 410 is implemented by a dedicated hardware circuit.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments thereof, it would be apparent to those skilled in the art that various changes and modifications may be made therein.

What is claimed is:

1. An image processing device comprising:
   a processor; and
   a memory storing computer-readable instructions therein, the computer-readable instructions, when executed by the processor, causing the image processing device to perform:
   acquiring first image data representing a first image and second image data representing a second image, the first image including a first edge and a first region, the second image including a second edge and a second region;
   generating, when a first condition is met, first combined image data representing a first combined image by using the first image data and the second image data so that the first region is overlapped with the second region; and
   generating, when a second condition different from the first condition is met, second combined image data representing a second combined image by using the first image data and the second image data so that the first edge adjoins the second edge,
   wherein the first image includes a first search region, the first search region including at least part of the first edge, wherein the second image includes a reference region, the reference region including at least part of the second edge,
wherein the generating the second combined image data includes:
searching an adjoining region from the first search region, the adjoining region satisfying an adjoining condition that the adjoining region represents an image adjoining an image in the reference region; and
setting a joining position of the second edge relative to the first edge, wherein when the second edge is positioned at the joining position relative to the first edge, a part of the second edge included in the reference region opposes to a part of the first edge included in the adjoining region,
wherein the second combined image data is generated so that the second edge is positioned at the joining position relative to the first edge,
wherein the first image further includes a second search region,
wherein the generating the first combined image data includes:
searching, from the second search region, the first region whose image satisfying a similarity condition that imposes a first standard of similarity on a similarity between an image in the first region and an image in the second region; and
setting a specific position of the second image relative to the first image so that the second region at the specific position is overlapped with the first region,
wherein a size and a shape of the first region are different from a size and a shape of the reference region and from a size and a shape of the adjoining region, and a size and a shape of the second region are different from the size and the shape of the reference region and from the size and the shape of the adjoining region,
wherein the adjoining condition imposes a second standard of similarity on a similarity between the image in the adjoining region and the image in the reference region,
wherein the second standard of similarity is lower than the first standard of similarity,
wherein the second search region is larger than the first search region.

2. The image processing device according to claim 1, wherein the first condition is met when a similarity condition, that an image in the first region is similar to an image in the second region, is met.

3. An image processing device comprising:
a processor; and
a memory storing computer-readable instructions therein, the computer-readable instructions, when executed by the processor, causing the image processing device to perform:
acquiring first image data representing a first image and second image data representing a second image, the first image including a first edge and a first region, the second image including a second edge and a second region;
generating, when a first condition is met, first combined image data representing a first combined image by using the first image data and the second image data so that the first region is overlapped with the second region; and
generating, when a second condition different from the first condition is met, second combined image data representing a second combined image by using the first image data and the second image data so that the first edge adjoins the second edge,
wherein the first condition is met when a similarity condition is met and a read condition is met,
wherein the second condition is met when the similarity condition is not met and the read condition is met,
wherein the similarity condition is that an image in the first region is similar to an image in the second region,
wherein the read condition is that the first image data is generated in a reading process in which an original placed on a platen is optically read and the second image data is generated in another reading process in which the original placed on the platen is optically read.

4. , An image processing device comprising:
a processor; and
a memory storing computer-readable instructions therein, the computer-readable instructions, when executed by the processor, causing the image processing device to perform:
acquiring first image data representing a first image and second image data representing a second image, the first image including a first edge and a first region, the second image including a second edge and a second region;
generating, when a first condition is met, first combined image data representing a first combined image by using the first image data and the second image data so that the first region is overlapped with the second region; and
generating, when a second condition different from the first condition is met, second combined image data representing a second combined image by using the first image data and the second image data so that the first edge adjoins the second edge,
wherein the first condition is met when a read condition is met,
wherein the second condition is met when a conveyance condition is met,
wherein the read condition is that the first image data is generated in a reading process in which an original placed on a platen is optically read and the second image data is generated in another reading process in which the original placed on the platen is optically read,
wherein the conveyance condition is that each of the first image data and the second image data is generated in at least one conveyance reading process in which an original is optically read while the original is conveyed by a conveying device.

5. The image processing device according to claim 4, wherein the conveyance condition is met when a condition, that both the first image data and the second image data are generated by a single conveyance reading process, is met.

6. The image processing device according to claim 1, wherein the first condition is met when a condition, that at least one of a size of the first image and a size of the second image is higher than a prescribed size, is met,
wherein the second condition is met when a condition, that both of the size of the first image and the size of the second image are smaller than or equal to the prescribed size, is met.

7. The image processing device according to claim 1, wherein the first condition is met when a condition, that generation of the first combined image data is performed in response to a first instruction from a user, is met,
wherein the second condition is met when a condition, that generation of the second combined image data is performed in response to a second instruction different from the first instruction from a user, is met.

8. The image processing device according to claim 3, wherein the second combined image includes an adjoining portion in which an image of the first edge adjoins an image of the second edge, wherein the generating the second combined image data includes smoothing color values in at least a part of the adjoining portion.

9. A method comprising:

acquiring first image data representing a first image and second image data representing a second image, the first image including a first edge and a first region, the second image including a second edge and a second region;

generating, when a first condition is met, first combined image data representing a first combined image by using the first image data and the second image data so that the first region is overlapped with the second region; and generating, when a second condition different from the first condition is met, second combined image data representing a second combined image by using the first image data and the second image data so that the first edge adjoins the second edge, wherein the first condition is met when a similarity condition is met and a read condition is met, wherein the second condition is met when the similarity condition is not met and the read condition is met, wherein the similarity condition is that an image in the first region is similar to an image in the second region, wherein the read condition is that the first image data is generated in a reading process in which an original placed on a platen is optically read and the second image data is generated in another reading process in which the original placed on the platen is optically read.

* * * * *

UNITED STATES PATENT AND TRADEMARK OFFICE
CERTIFICATE OF CORRECTION

PATENT NO.       : 9,628,666 B2
APPLICATION NO.  : 14/868595
DATED            : April 18, 2017
INVENTOR(S)      : Takuya Shimahashi It is certified that error appears in the above-identified patent and that said Letters Patent is hereby corrected as shown below:

Claim 4, Column 28, Line 14 should read:
    4. An image processing device comprising:

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*